(12) United States Patent
Browning et al.

(10) Patent No.: US 10,604,259 B2
(45) Date of Patent: Mar. 31, 2020

(54) OCCUPANT RESTRAINT SYSTEMS HAVING EXTENDING RESTRAINTS, AND ASSOCIATED SYSTEMS AND METHODS

(71) Applicant: AmSafe, Inc., Phoenix, AZ (US)

(72) Inventors: Matthew James Browning, Gilbert, AZ (US); William Joseph Gehret, Chandler, AZ (US); Todd Humbert, Chandler, AZ (US); Richard Patterson, Twickenham (GB)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 15/406,412

(22) Filed: Jan. 13, 2017

(65) Prior Publication Data

US 2018/0201375 A1    Jul. 19, 2018
US 2020/0055602 A9    Feb. 20, 2020

Related U.S. Application Data

(60) Provisional application No. 62/495,602, filed on Jan. 20, 2016.

(51) Int. Cl.
     *B60R 21/16*         (2006.01)
     *B64D 11/06*        (2006.01)
     (Continued)

(52) U.S. Cl.
     CPC ...... *B64D 11/062* (2014.12); *B60R 21/01554* (2014.10); *B60R 21/16* (2013.01);
     (Continued)

(58) Field of Classification Search
     CPC .............. B64D 11/062; B64D 11/0621; B64D 11/0601; B60R 22/16; B60R 22/26;
     (Continued)

(56) References Cited

U.S. PATENT DOCUMENTS

| 1,369,456 A | 2/1921 | Meredith |
| 1,438,898 A | 12/1922 | Carpmill |

(Continued)

FOREIGN PATENT DOCUMENTS

| CA | 2036493 A1 | 8/1991 |
| CA | 2038505 A1 | 9/1991 |

(Continued)

OTHER PUBLICATIONS

"Takata Melds Air Bag with Seat Belt," The Japan Times, Nov. 27, 2010, 1 page.

(Continued)

*Primary Examiner* — Drew J Brown
(74) *Attorney, Agent, or Firm* — Perkins Coie LLP

(57) ABSTRACT

Various embodiments of vehicle occupant safety systems having extendable restraints for use with, for example, airbags are described herein. In one embodiment, for example, the disclosed technology includes a 2-point occupant restraint that secures an occupant in an aircraft seat. In this embodiment, the aircraft seat is positioned in a seating area that includes a forward monument housing a stowed airbag. In the event of a crash or other significant dynamic event that causes, for example, a rapid deceleration of the aircraft above a preset magnitude, the airbag deploys between the occupant and the monument as the dynamic forces cause the occupant to pitch forward. The forward momentum of the occupant's body creates a significant tension load in the 2-point restraint, which causes the restraint to extend by a preset amount, thereby allowing the occupant to move forward in the seat more than the occupant would have moved had the occupant been wearing a conventional, non-extending 2-point restraint. Although the occupant is allowed to move forward, the occupant remains secured to the extended restraint by means of non-extending (Continued)

webbing that is secured around the waist of the occupant. Allowing the occupant to move forward in this manner enables the occupant's upper torso to impact the airbag at a reduced or otherwise more favorable angle. This can reduce both the speed and the angle at which the occupant's head impacts the airbag, thereby reducing the likelihood of injury.

24 Claims, 15 Drawing Sheets

(51) Int. Cl.
  *B60R 22/12*     (2006.01)
  *B60R 22/26*     (2006.01)
  *B60R 22/16*     (2006.01)
  *B60R 21/015*    (2006.01)
  *B60R 21/00*     (2006.01)
  *B60R 22/18*     (2006.01)
  *B60R 21/207*    (2006.01)

(52) U.S. Cl.
  CPC .............. *B60R 22/12* (2013.01); *B60R 22/16* (2013.01); *B60R 22/26* (2013.01); *B64D 11/0601* (2014.12); *B64D 11/0621* (2014.12); *B60R 2021/0032* (2013.01); *B60R 2021/0093* (2013.01); *B60R 2021/2074* (2013.01); *B60R 2022/1806* (2013.01); *B60R 2022/1831* (2013.01)

(58) Field of Classification Search
  CPC . B60R 22/12; B60R 21/16; B60R 2021/0032; B60R 2021/0093; B60R 2022/1831; B60R 2022/1806
  See application file for complete search history.

(56) References Cited

U.S. PATENT DOCUMENTS

| | | |
|---|---|---|
| 1,816,262 A | 7/1931 | Ritter |
| 1,930,378 A | 10/1933 | Beagan |
| 2,132,556 A | 10/1938 | Blackshaw |
| 2,255,258 A | 9/1941 | Lethern et al. |
| 2,372,557 A | 3/1945 | Dowd |
| 2,393,178 A | 1/1946 | Manson |
| 2,437,585 A | 3/1948 | Zimmern |
| 2,482,693 A | 9/1949 | Rogers et al. |
| 2,502,206 A | 3/1950 | Creek |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,668,997 A | 2/1954 | Irvin et al. |
| 2,710,999 A | 6/1955 | Davis |
| 2,763,451 A | 9/1956 | Moran |
| 2,803,864 A | 8/1957 | Bishaf |
| 2,845,233 A | 7/1958 | Pfankuch et al. |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,921,353 A | 1/1960 | Cushman |
| 2,938,254 A | 5/1960 | Gaylord |
| D188,897 S | 9/1960 | Prete, Jr. |
| 2,964,815 A | 12/1960 | Sereno |
| 2,965,942 A | 12/1960 | Carter |
| 3,029,487 A | 4/1962 | Shinichiro |
| 3,034,596 A | 5/1962 | Twaits, Jr. |
| 3,074,760 A * | 1/1963 | Hodgekin ............... B60R 22/16 182/3 |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,132,399 A | 5/1964 | Cooper |
| 3,137,907 A | 6/1964 | Unai |
| D198,566 S | 7/1964 | Holmberg |
| 3,142,103 A | 7/1964 | Lindblad |
| 3,142,968 A | 8/1964 | Basham et al. |
| 3,145,442 A | 8/1964 | Brown |
| 3,165,805 A | 1/1965 | Lower |
| 3,178,226 A | 4/1965 | Cates |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board et al. |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,323,829 A | 6/1967 | Liem |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein et al. |
| 3,430,979 A | 3/1969 | Terry et al. |
| 3,451,720 A | 6/1969 | Makinen |
| 3,473,201 A | 10/1969 | Hopka et al. |
| 3,491,414 A | 1/1970 | Stoffel |
| 3,505,711 A | 4/1970 | Carter |
| 3,523,342 A | 8/1970 | Spires |
| D218,589 S | 9/1970 | Lohr |
| 3,560,027 A | 2/1971 | Graham |
| 3,564,672 A | 2/1971 | McIntyre |
| 3,576,056 A | 4/1971 | Barcus |
| 3,586,347 A | 6/1971 | Carey et al. |
| 3,591,900 A | 7/1971 | Brown |
| 3,603,535 A | 9/1971 | DePolo |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,682,498 A | 8/1972 | Rutzki |
| 3,695,696 A | 10/1972 | Lohr et al. |
| 3,706,463 A | 12/1972 | Lipkin |
| 3,714,684 A | 2/1973 | Gley |
| 3,730,583 A | 5/1973 | Colovas et al. |
| 3,744,102 A | 7/1973 | Gaylord |
| 3,744,103 A | 7/1973 | Gaylord |
| 3,747,167 A | 7/1973 | Pravaz |
| 3,756,620 A | 9/1973 | Radke |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,801,156 A | 4/1974 | Granig |
| 3,820,842 A | 6/1974 | Stephenson |
| 3,825,979 A | 7/1974 | Jakob |
| 3,827,716 A | 8/1974 | Vaughn et al. |
| 3,841,654 A | 10/1974 | Lewis |
| 3,856,351 A | 12/1974 | Garvey |
| 3,865,398 A | 2/1975 | Woll |
| 3,866,940 A | 2/1975 | Lewis |
| 3,879,810 A | 4/1975 | Prete, Jr. et al. |
| 3,888,503 A | 6/1975 | Hamilton |
| 3,897,081 A | 7/1975 | Lewis |
| 3,898,715 A | 8/1975 | Balder |
| 3,905,615 A | 9/1975 | Schulman |
| 3,933,370 A | 1/1976 | Abe et al. |

(56) References Cited

U.S. PATENT DOCUMENTS

| | | |
|---|---|---|
| 3,935,618 A | 2/1976 | Fohl |
| 3,948,541 A | 4/1976 | Schulman |
| 3,964,138 A | 6/1976 | Gaylord |
| 3,970,329 A | 7/1976 | Lewis |
| 3,971,569 A | 7/1976 | Abe et al. |
| 3,975,800 A | 8/1976 | Farlind |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla |
| 4,107,604 A | 8/1978 | Bernier |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | Dipaola |
| 4,228,567 A | 10/1980 | Ikesue et al. |
| 4,239,260 A | 12/1980 | Hollowell |
| 4,253,623 A | 3/1981 | Steger et al. |
| 4,261,535 A | 4/1981 | Swanson |
| 4,262,396 A | 4/1981 | Koike |
| 4,273,301 A | 6/1981 | Frankila |
| 4,302,049 A | 11/1981 | Simpson |
| 4,317,263 A | 3/1982 | Fohl |
| 4,321,734 A | 3/1982 | Gandelman |
| 4,323,204 A | 4/1982 | Takada |
| 4,334,341 A | 6/1982 | Krautz et al. |
| 4,336,636 A | 6/1982 | Ishiguro et al. |
| 4,344,588 A | 8/1982 | Hollowell et al. |
| 4,366,604 A | 1/1983 | Anthony et al. |
| 4,385,425 A | 5/1983 | Tanaka et al. |
| 4,403,376 A | 9/1983 | Palloks |
| 4,408,374 A | 10/1983 | Fohl |
| 4,419,874 A | 12/1983 | Brentini |
| 4,425,688 A | 1/1984 | Anthony et al. |
| 4,428,103 A | 1/1984 | Wier et al. |
| 4,437,628 A | 3/1984 | Schwartz |
| 4,454,634 A | 6/1984 | Haglund et al. |
| D274,861 S | 7/1984 | Lindblad |
| 4,457,052 A | 7/1984 | Hauber |
| 4,457,251 A | 7/1984 | Weman et al. |
| 4,487,454 A | 12/1984 | Biller |
| 4,491,343 A | 1/1985 | Fohl |
| 4,525,901 A | 7/1985 | Krauss |
| 4,536,008 A | 8/1985 | Brown |
| 4,545,097 A | 10/1985 | Wier |
| 4,549,769 A | 10/1985 | Pilarski |
| 4,555,831 A | 12/1985 | Otzen et al. |
| 4,562,625 A | 1/1986 | Hunter et al. |
| 4,565,535 A | 1/1986 | Tassy |
| 4,569,535 A | 2/1986 | Haglund et al. |
| 4,574,911 A | 3/1986 | North et al. |
| 4,587,696 A | 5/1986 | Morinaga et al. |
| 4,588,208 A * | 5/1986 | Yoshitsugu ............ B60R 22/16 188/376 |
| D285,383 S | 9/1986 | Anthony |
| 4,611,491 A | 9/1986 | Brown et al. |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson |
| 4,644,618 A | 2/1987 | Holmberg et al. |
| 4,646,400 A | 3/1987 | Tanaka |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,657,516 A | 4/1987 | Tassy |
| 4,660,889 A | 4/1987 | Anthony et al. |
| 4,679,852 A | 7/1987 | Anthony et al. |
| 4,682,791 A | 7/1987 | Ernst |
| 4,685,176 A | 8/1987 | Burnside |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,722,573 A | 2/1988 | Komohara |
| 4,726,625 A | 2/1988 | Bougher |
| 4,727,628 A | 3/1988 | Rudholm |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,765,569 A | 8/1988 | Higgins |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen |
| 4,832,410 A | 5/1989 | Bougher |
| 4,842,299 A | 6/1989 | Okamura et al. |
| 4,843,688 A | 7/1989 | Ikeda |
| 4,854,607 A | 8/1989 | Mandracchia et al. |
| 4,854,608 A | 8/1989 | Barral |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno |
| 4,942,649 A | 7/1990 | Anthony et al. |
| 4,971,354 A | 11/1990 | Kim |
| 4,987,783 A | 1/1991 | D'Antonio et al. |
| 4,995,638 A | 2/1991 | Shinto et al. |
| 4,995,640 A | 2/1991 | Saito |
| 5,015,010 A | 5/1991 | Homeier et al. |
| 5,023,981 A | 6/1991 | Anthony et al. |
| 5,026,093 A | 6/1991 | Nishikaji |
| 5,026,305 A | 6/1991 | Del Guidice et al. |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,062,662 A | 11/1991 | Cameron |
| 5,062,663 A | 11/1991 | Satoh |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen |
| 5,097,572 A | 3/1992 | Warrick |
| 5,100,176 A | 3/1992 | Ball et al. |
| D327,455 S | 6/1992 | Blair |
| 5,119,532 A | 6/1992 | Tanaka |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke |
| 5,160,186 A | 11/1992 | Lee |
| 5,161,821 A | 11/1992 | Curtis |
| 5,162,006 A | 11/1992 | Yandle, II |
| 5,165,149 A | 11/1992 | Nihei |
| 5,170,539 A | 12/1992 | Lundstedt et al. |

(56) References Cited

U.S. PATENT DOCUMENTS

| | | |
|---|---|---|
| D332,433 S | 1/1993 | Bougher |
| 5,176,402 A | 1/1993 | Coulon |
| 5,182,837 A | 2/1993 | Anthony et al. |
| 5,183,288 A | 2/1993 | Inada et al. |
| 5,184,844 A | 2/1993 | Goor |
| 5,194,755 A | 3/1993 | Rhee et al. |
| 5,199,739 A | 4/1993 | Fujiwara et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth |
| 5,236,220 A | 8/1993 | Mills |
| 5,246,250 A | 9/1993 | Wolanin et al. |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,280,953 A | 1/1994 | Wolanin et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,288,104 A | 2/1994 | Chen |
| 5,292,181 A | 3/1994 | Dybro |
| 5,299,827 A | 4/1994 | Igawa |
| 5,301,371 A | 4/1994 | Chao |
| 5,306,044 A | 4/1994 | Tucker |
| 5,308,148 A | 5/1994 | Peterson et al. |
| 5,311,653 A | 5/1994 | Merrick |
| 5,324,071 A | 6/1994 | Gotomyo et al. |
| 5,332,968 A | 7/1994 | Brown |
| 5,335,937 A | 8/1994 | Uphues et al. |
| 5,335,939 A | 8/1994 | Kuriyama et al. |
| 5,344,210 A | 9/1994 | Marwan et al. |
| 5,350,195 A | 9/1994 | Brown |
| 5,350,196 A | 9/1994 | Atkins |
| 5,364,048 A | 11/1994 | Fujimura et al. |
| 5,369,855 A | 12/1994 | Tokugawa |
| 5,370,333 A | 12/1994 | Lortz et al. |
| 5,375,875 A | 12/1994 | DiSalvo et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,400,867 A | 3/1995 | Muller et al. |
| 5,403,038 A | 4/1995 | Mcfalls |
| 5,406,681 A | 4/1995 | Olson |
| 5,411,289 A | 5/1995 | Smith et al. |
| 5,411,292 A | 5/1995 | Collins et al. |
| 5,416,957 A | 5/1995 | Renzi, Sr. et al. |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| D362,415 S | 9/1995 | Takimoto |
| 5,447,327 A | 9/1995 | Jarboe et al. |
| 5,451,094 A | 9/1995 | Templin et al. |
| 5,454,595 A | 10/1995 | Olson et al. |
| 5,456,491 A | 10/1995 | Chen et al. |
| D364,124 S | 11/1995 | Lortz et al. |
| 5,465,999 A | 11/1995 | Tanaka et al. |
| 5,470,103 A | 11/1995 | Vaillancourt et al. |
| 5,471,714 A | 12/1995 | Olson |
| 5,472,231 A | 12/1995 | France |
| 5,473,111 A | 12/1995 | Hattori et al. |
| 5,482,230 A | 1/1996 | Bird et al. |
| 5,485,041 A | 1/1996 | Meister |
| 5,492,360 A | 2/1996 | Logeman |
| 5,492,361 A | 2/1996 | Kim |
| 5,495,646 A | 3/1996 | Scrutchfield et al. |
| 5,496,059 A | 3/1996 | Bauer |
| 5,497,956 A | 3/1996 | Crook |
| 5,499,840 A | 3/1996 | Nakano |
| 5,511,856 A | 4/1996 | Merrick et al. |
| 5,516,199 A | 5/1996 | Crook et al. |
| 5,526,556 A | 6/1996 | Czank |
| 5,529,343 A * | 6/1996 | Klink ...................... B60R 22/16 280/801.1 |
| 5,540,403 A | 7/1996 | Standley |
| 5,547,223 A * | 8/1996 | Koketsu ................. B60R 22/16 280/801.1 |
| 5,556,056 A | 9/1996 | Kalberer et al. |
| 5,558,300 A | 9/1996 | Kalberer et al. |
| 5,560,565 A | 10/1996 | Merrick et al. |
| 5,561,891 A | 10/1996 | Hsieh |
| 5,564,734 A | 10/1996 | Stuckle |
| 5,566,431 A | 10/1996 | Haglund |
| 5,568,676 A | 10/1996 | Freeman |
| 5,570,933 A | 11/1996 | Rouhana et al. |
| 5,577,683 A | 11/1996 | Imai |
| 5,579,785 A | 12/1996 | Bell |
| 5,584,107 A | 12/1996 | Koyanagi et al. |
| 5,588,189 A | 12/1996 | Gorman et al. |
| 5,597,178 A | 1/1997 | Hardin, Jr. |
| 5,606,783 A | 3/1997 | Gillis et al. |
| 5,609,363 A | 3/1997 | Finelli |
| 5,622,327 A | 4/1997 | Heath et al. |
| 5,628,548 A | 5/1997 | Lacoste |
| 5,630,616 A | 5/1997 | McPherson |
| 5,634,664 A | 6/1997 | Seki et al. |
| 5,640,468 A | 6/1997 | Hsu |
| 5,658,012 A * | 8/1997 | Villarreal ................ B60R 22/16 280/805 |
| 5,669,572 A | 9/1997 | Crook |
| 5,672,916 A | 9/1997 | Mattes et al. |
| 5,695,242 A | 12/1997 | Brantman et al. |
| 5,695,243 A | 12/1997 | Anthony et al. |
| 5,699,594 A | 12/1997 | Czank et al. |
| D389,426 S | 1/1998 | Merrick et al. |
| 5,718,455 A * | 2/1998 | Kawaguchi ............. B60R 22/16 188/376 |
| 5,722,689 A | 3/1998 | Chen et al. |
| 5,727,270 A | 3/1998 | Cope et al. |
| 5,734,318 A | 3/1998 | Nitschke et al. |
| 5,743,597 A | 4/1998 | Jessup et al. |
| 5,752,714 A | 5/1998 | Pripps et al. |
| 5,758,900 A | 6/1998 | Knoll et al. |
| 5,765,774 A | 6/1998 | Maekawa et al. |
| 5,765,869 A | 6/1998 | Huber |
| 5,772,238 A | 6/1998 | Breed et al. |
| 5,774,947 A | 7/1998 | Anscher |
| 5,779,319 A | 7/1998 | Merrick |
| D397,063 S | 8/1998 | Woellert et al. |
| 5,788,280 A * | 8/1998 | Ohsumi ................. B60R 22/023 280/805 |
| 5,788,281 A | 8/1998 | Yanagi et al. |
| 5,788,282 A | 8/1998 | Lewis |
| 5,794,878 A | 8/1998 | Carpenter et al. |
| 5,802,479 A | 9/1998 | Kithil et al. |
| 5,803,489 A | 9/1998 | Nusshor |
| 5,806,148 A | 9/1998 | Mcfalls et al. |
| 5,813,097 A | 9/1998 | Woellert et al. |
| 5,839,753 A | 11/1998 | Yaniv et al. |
| 5,839,793 A | 11/1998 | Merrick et al. |
| 5,851,055 A | 12/1998 | Lewis |
| 5,853,191 A | 12/1998 | Lachat |
| 5,857,247 A | 1/1999 | Warrick et al. |
| 5,863,065 A | 1/1999 | Boydston et al. |
| 5,868,421 A | 2/1999 | Eyrainer |
| 5,871,230 A | 2/1999 | Lewis |
| 5,871,231 A | 2/1999 | Richards et al. |
| 5,873,599 A | 2/1999 | Bauer et al. |
| 5,873,635 A | 2/1999 | Merrick |
| 5,882,084 A | 3/1999 | Verellen et al. |
| 5,886,373 A | 3/1999 | Hosogi |
| D407,667 S | 4/1999 | Homeier |
| 5,906,391 A | 5/1999 | Weir et al. |
| 5,908,223 A | 6/1999 | Miller |
| 5,911,434 A | 6/1999 | Townsend |
| 5,915,630 A | 6/1999 | Step |
| 5,924,726 A | 7/1999 | Pan |

(56) References Cited

U.S. PATENT DOCUMENTS

| | | | |
|---|---|---|---|
| 5,927,748 A | 7/1999 | O'Driscoll |
| 5,927,754 A | 7/1999 | Patzelt et al. |
| 5,934,760 A | 8/1999 | Schroth |
| 5,947,513 A | 9/1999 | Lehto |
| 5,955,714 A | 9/1999 | Reneau |
| D416,827 S | 11/1999 | Anthony et al. |
| 5,975,565 A | 11/1999 | Cuevas |
| 5,979,026 A | 11/1999 | Anthony |
| 5,979,982 A | 11/1999 | Nakagawa |
| 5,984,350 A | 11/1999 | Hagan et al. |
| 5,988,438 A | 11/1999 | Lewis et al. |
| 5,996,192 A | 12/1999 | Haines et al. |
| 6,003,899 A | 12/1999 | Chaney |
| 6,017,087 A | 1/2000 | Anthony et al. |
| 6,018,130 A | 1/2000 | Haack et al. |
| RE36,587 E | 2/2000 | Tanaka et al. |
| 6,019,388 A | 2/2000 | Okazaki et al. |
| 6,019,392 A | 2/2000 | Karlow |
| 6,019,861 A | 2/2000 | Canterberry et al. |
| 6,042,139 A | 3/2000 | Knox |
| RE36,661 E | 4/2000 | Tanaka et al. |
| 6,056,320 A * | 5/2000 | Khalifa ............... B60R 22/28 280/805 |
| 6,059,311 A | 5/2000 | Wipasuramonton et al. |
| 6,059,312 A | 5/2000 | Staub et al. |
| 6,065,367 A | 5/2000 | Schroth |
| 6,065,772 A | 5/2000 | Yamamoto et al. |
| 6,065,777 A | 5/2000 | Merrick |
| 6,082,763 A | 7/2000 | Kokeguchi |
| 6,113,132 A | 9/2000 | Saslecov |
| 6,123,388 A | 9/2000 | Vits et al. |
| 6,126,194 A | 10/2000 | Yaniv et al. |
| 6,135,489 A | 10/2000 | Bowers |
| 6,138,328 A | 10/2000 | Iseki |
| 6,142,508 A | 11/2000 | Lewis |
| 6,142,511 A | 11/2000 | Lewis |
| 6,149,231 A | 11/2000 | Wustholz |
| 6,152,481 A | 11/2000 | Webber et al. |
| 6,155,595 A | 12/2000 | Schultz |
| 6,155,598 A | 12/2000 | Kutchey |
| 6,158,765 A | 12/2000 | Sinnhuber |
| 6,168,195 B1 | 1/2001 | Okazaki et al. |
| 6,173,988 B1 | 1/2001 | Igawa |
| 6,179,329 B1 | 1/2001 | Bradley |
| 6,182,783 B1 | 2/2001 | Bayley |
| 6,193,269 B1 | 2/2001 | Amamori |
| 6,203,058 B1 | 3/2001 | Elqadah et al. |
| 6,206,411 B1 | 3/2001 | Sunabashiri |
| RE37,123 E | 4/2001 | Templin et al. |
| 6,217,059 B1 | 4/2001 | Brown et al. |
| 6,224,097 B1 | 5/2001 | Lewis |
| 6,224,154 B1 | 5/2001 | Stoki |
| 6,230,370 B1 | 5/2001 | Nelsen |
| 6,254,121 B1 | 7/2001 | Fowler et al. |
| 6,254,130 B1 | 7/2001 | Jayaraman et al. |
| 6,260,572 B1 | 7/2001 | Wu |
| 6,260,877 B1 | 7/2001 | Rasmussen et al. |
| 6,260,884 B1 | 7/2001 | Bittner et al. |
| 6,276,714 B1 | 8/2001 | Yoshioka |
| 6,276,721 B1 | 8/2001 | Romeo |
| 6,293,582 B1 | 9/2001 | Lewis |
| 6,295,700 B1 | 10/2001 | Plzak |
| 6,299,103 B1 | 10/2001 | Shope et al. |
| 6,309,024 B1 | 10/2001 | Busch |
| 6,312,015 B1 | 11/2001 | Merrick et al. |
| 6,313,418 B1 | 11/2001 | Reneau |
| 6,315,232 B1 | 11/2001 | Merrick |
| 6,322,140 B1 | 11/2001 | Jessup et al. |
| 6,322,149 B1 | 11/2001 | Conforti et al. |
| 6,324,730 B1 | 12/2001 | Iseki |
| 6,325,412 B1 | 12/2001 | Pan |
| 6,328,379 B1 | 12/2001 | Merrick et al. |
| 6,336,653 B1 | 1/2002 | Yaniv et al. |
| 6,336,656 B1 | 1/2002 | Romeo |
| 6,336,657 B1 | 1/2002 | Akaba et al. |
| 6,343,841 B1 | 2/2002 | Gregg et al. |
| 6,351,717 B2 | 2/2002 | Lambrecht |
| 6,357,790 B1 | 3/2002 | Swann et al. |
| 6,358,591 B1 | 3/2002 | Smith |
| 6,363,591 B1 | 4/2002 | Bell et al. |
| 6,367,882 B1 | 4/2002 | Van Druff et al. |
| 6,374,168 B1 | 4/2002 | Fujii |
| 6,378,896 B1 | 4/2002 | Sakakida et al. |
| 6,378,897 B1 | 4/2002 | Butters et al. |
| 6,378,898 B1 | 4/2002 | Lewis et al. |
| 6,382,666 B1 | 5/2002 | Devonport |
| 6,390,502 B1 | 5/2002 | Ryan et al. |
| 6,398,254 B2 | 6/2002 | David et al. |
| 6,400,145 B1 | 6/2002 | Chamings et al. |
| 6,406,058 B1 | 6/2002 | Devonport et al. |
| 6,412,863 B1 | 7/2002 | Merrick et al. |
| 6,412,864 B1 | 7/2002 | Larson |
| 6,418,596 B2 | 7/2002 | Haas |
| 6,419,263 B1 | 7/2002 | Büsgen et al. |
| 6,422,512 B1 | 7/2002 | Lewis et al. |
| 6,425,601 B1 | 7/2002 | Lewis et al. |
| 6,425,632 B1 | 7/2002 | Anthony et al. |
| 6,439,600 B1 | 8/2002 | Adkisson |
| 6,442,807 B1 | 9/2002 | Adkisson |
| 6,443,496 B2 | 9/2002 | Campau et al. |
| 6,446,272 B1 | 9/2002 | Lee |
| 6,460,878 B2 | 10/2002 | Eckert et al. |
| 6,463,638 B1 | 10/2002 | Pontaoe |
| 6,467,849 B1 | 10/2002 | Deptolla |
| 6,485,057 B1 | 11/2002 | Midorikawa et al. |
| 6,485,098 B1 | 11/2002 | Vits et al. |
| 6,491,347 B2 | 12/2002 | Iseki |
| 6,505,853 B2 | 1/2003 | Brannon et al. |
| 6,508,487 B2 | 1/2003 | Koster |
| 6,508,515 B2 | 1/2003 | Vits et al. |
| 6,513,208 B1 | 2/2003 | Sack et al. |
| 6,517,110 B1 | 2/2003 | Butters et al. |
| 6,520,392 B2 | 2/2003 | Thibodeau et al. |
| 6,523,856 B2 | 2/2003 | Braun et al. |
| 6,533,315 B2 | 3/2003 | Brown et al. |
| 6,543,101 B2 | 4/2003 | Sack et al. |
| 6,547,273 B2 | 4/2003 | Grace et al. |
| 6,550,809 B1 | 4/2003 | Masuda et al. |
| 6,557,887 B2 | 5/2003 | Wohllebe |
| 6,560,825 B2 | 5/2003 | Maciejczyk |
| 6,566,869 B2 | 5/2003 | Chamings et al. |
| 6,581,968 B1 | 6/2003 | Grace et al. |
| 6,585,289 B1 | 7/2003 | Hammer et al. |
| 6,588,077 B2 | 7/2003 | Katsuyama et al. |
| 6,592,149 B2 | 7/2003 | Sessoms |
| 6,606,770 B1 | 8/2003 | Badrenas |
| 6,607,210 B2 | 8/2003 | Eckert et al. |
| 6,612,611 B1 | 9/2003 | Swann et al. |
| 6,616,177 B2 | 9/2003 | Thomas et al. |
| 6,619,689 B2 | 9/2003 | Spencer et al. |
| 6,619,753 B2 | 9/2003 | Takayama |
| 6,631,926 B2 | 10/2003 | Merrick et al. |
| 6,648,367 B2 | 11/2003 | Breed et al. |
| 6,665,912 B2 | 12/2003 | Turner et al. |
| 6,669,229 B2 | 12/2003 | Thomas et al. |
| 6,682,141 B2 | 1/2004 | Coughren et al. |
| 6,688,642 B2 | 2/2004 | Sollars, Jr. |
| 6,692,021 B2 | 2/2004 | Amamori |
| 6,694,577 B2 | 2/2004 | Di Perrero |
| 6,705,641 B2 | 3/2004 | Schneider et al. |
| 6,709,005 B2 | 3/2004 | Amamori |
| 6,711,790 B2 | 3/2004 | Pontaoe |
| 6,712,920 B2 | 3/2004 | Masuda et al. |
| 6,715,786 B1 | 4/2004 | Willibey |
| 6,715,788 B2 | 4/2004 | Saiguchi et al. |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,729,643 B1 | 5/2004 | Bassick et al. |
| 6,733,041 B2 | 5/2004 | Arnold et al. |
| 6,739,264 B2 | 5/2004 | Hosey et al. |
| 6,739,541 B2 | 5/2004 | Palliser et al. |
| 6,746,074 B1 | 6/2004 | Kempf et al. |

(56) References Cited

U.S. PATENT DOCUMENTS

| | | |
|---|---|---|
| 6,749,150 B2 | 6/2004 | Kohlndorfer et al. |
| 6,749,220 B1 | 6/2004 | Wipasuramonton et al. |
| 6,758,489 B2 | 7/2004 | Xu |
| 6,763,557 B2 | 7/2004 | Steiff et al. |
| 6,764,097 B2 | 7/2004 | Kelley et al. |
| 6,769,157 B1 | 8/2004 | Meal |
| 6,769,714 B2 | 8/2004 | Hosey et al. |
| 6,773,030 B2 | 8/2004 | Fischer |
| 6,776,434 B2 | 8/2004 | Ford et al. |
| 6,779,813 B2 | 8/2004 | Lincoln |
| 6,786,294 B2 | 9/2004 | Specht |
| 6,786,510 B2 | 9/2004 | Roychoudhury et al. |
| 6,786,511 B2 | 9/2004 | Heckmayr |
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,793,291 B1 | 9/2004 | Kocher |
| 6,796,007 B1 | 9/2004 | Anscher |
| 6,796,578 B2 | 9/2004 | White et al. |
| 6,802,470 B2 | 10/2004 | Smithson et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,820,310 B2 | 11/2004 | Woodard et al. |
| 6,820,902 B2 | 11/2004 | Kim |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,832,778 B2 | 12/2004 | Pinsenschaum et al. |
| 6,834,822 B2 | 12/2004 | Koning et al. |
| 6,836,754 B2 | 12/2004 | Cooper |
| 6,837,079 B1 | 1/2005 | Takeuchi |
| 6,837,519 B2 | 1/2005 | Moskalik et al. |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,840,544 B2 | 1/2005 | Prentkowski |
| 6,843,503 B2 | 1/2005 | Ford |
| 6,846,005 B2 | 1/2005 | Ford et al. |
| 6,851,160 B2 | 2/2005 | Carver |
| 6,851,374 B1 | 2/2005 | Kelley et al. |
| 6,857,326 B2 | 2/2005 | Specht et al. |
| 6,857,657 B2 | 2/2005 | Canterberry et al. |
| 6,860,509 B2 | 3/2005 | Xu et al. |
| 6,860,671 B2 | 3/2005 | Schulz |
| 6,863,235 B2 | 3/2005 | Koning et al. |
| 6,863,298 B2 | 3/2005 | Sakai et al. |
| 6,863,301 B2 | 3/2005 | Ford et al. |
| 6,868,585 B2 | 3/2005 | Anthony et al. |
| 6,868,591 B2 | 3/2005 | Dingman et al. |
| 6,869,101 B2 | 3/2005 | White et al. |
| 6,871,872 B2 | 3/2005 | Thomas |
| 6,871,874 B2 | 3/2005 | Husby et al. |
| 6,871,876 B2 | 3/2005 | Xu |
| 6,874,812 B2 | 4/2005 | Keutz et al. |
| 6,874,814 B2 | 4/2005 | Hosey et al. |
| 6,874,819 B2 | 4/2005 | O'Neill |
| 6,877,771 B2 | 4/2005 | Weber |
| 6,882,914 B2 | 4/2005 | Gioutsos et al. |
| 6,886,469 B2 | 5/2005 | Shilliday et al. |
| 6,886,856 B2 | 5/2005 | Canterberry et al. |
| 6,886,857 B1 | 5/2005 | Mishina et al. |
| 6,886,858 B2 | 5/2005 | Olson |
| 6,886,889 B2 | 5/2005 | Vits et al. |
| 6,887,325 B2 | 5/2005 | Canterberry et al. |
| 6,894,483 B2 | 5/2005 | Pettypiece, Jr. et al. |
| 6,896,291 B1 | 5/2005 | Peterson |
| 6,902,193 B2 | 6/2005 | Kim et al. |
| 6,905,134 B2 | 6/2005 | Saiguchi et al. |
| 6,908,104 B2 | 6/2005 | Canterberry et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,923,483 B2 | 8/2005 | Curry et al. |
| 6,929,283 B2 | 8/2005 | Gioutsos et al. |
| 6,931,669 B2 | 8/2005 | Ashline |
| 6,932,378 B2 | 8/2005 | Thomas |
| 6,932,385 B2 | 8/2005 | Hawthorn et al. |
| 6,935,684 B2 | 8/2005 | Sakai |
| 6,935,701 B1 | 8/2005 | Arnold et al. |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,789 B2 | 10/2005 | Bowman et al. |
| 6,957,828 B2 | 10/2005 | Keeslar et al. |
| 6,959,946 B2 | 11/2005 | Desmarais et al. |
| 6,962,363 B2 | 11/2005 | Wang et al. |
| 6,962,364 B2 | 11/2005 | Ju et al. |
| 6,962,394 B2 | 11/2005 | Anthony et al. |
| 6,966,518 B2 | 11/2005 | Kohlndorfer et al. |
| 6,966,576 B1 | 11/2005 | Greenstein |
| 6,969,022 B2 | 11/2005 | Bell et al. |
| 6,969,122 B2 | 11/2005 | Sachs et al. |
| 6,974,154 B2 | 12/2005 | Grossert et al. |
| 6,983,956 B2 | 1/2006 | Canterberry et al. |
| 6,993,436 B2 | 1/2006 | Specht et al. |
| 6,994,372 B2 | 2/2006 | Ford et al. |
| 6,997,474 B2 | 2/2006 | Midorikawa et al. |
| 6,997,479 B2 | 2/2006 | Desmarais et al. |
| 7,007,973 B2 | 3/2006 | Canterberry et al. |
| 7,010,836 B2 | 3/2006 | Acton et al. |
| 7,017,945 B2 | 3/2006 | DePottey et al. |
| D519,406 S | 4/2006 | Merrill et al. |
| 7,021,653 B2 | 4/2006 | Burdock et al. |
| 7,025,297 B2 | 4/2006 | Bell et al. |
| 7,029,024 B2 | 4/2006 | Baumbach |
| 7,029,067 B2 | 4/2006 | Vits et al. |
| 7,036,844 B2 | 5/2006 | Hammer et al. |
| 7,040,696 B2 | 5/2006 | Vits et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann |
| 7,055,856 B2 | 6/2006 | Ford et al. |
| 7,055,904 B2 | 6/2006 | Skelly et al. |
| 7,063,350 B2 | 6/2006 | Steimke et al. |
| 7,065,843 B1 | 6/2006 | Wu |
| 7,070,203 B2 | 7/2006 | Fisher et al. |
| 7,073,866 B1 | 7/2006 | Berdahl |
| 7,077,475 B2 | 7/2006 | Boyle |
| 7,080,856 B2 | 7/2006 | Desmarais et al. |
| 7,081,692 B2 | 7/2006 | Pettypiece, Jr. et al. |
| 7,083,147 B2 | 8/2006 | Movsesian et al. |
| 7,090,246 B2 | 8/2006 | Lincoln et al. |
| 7,100,991 B2 | 9/2006 | Schroth |
| 7,107,133 B2 | 9/2006 | Fisher et al. |
| 7,108,114 B2 | 9/2006 | Mori et al. |
| 7,111,904 B2 | 9/2006 | Dowty et al. |
| 7,118,133 B2 | 10/2006 | Bell et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,131,667 B2 | 11/2006 | Bell et al. |
| 7,131,698 B2 | 11/2006 | Dowty et al. |
| 7,134,691 B2 | 11/2006 | Dunkle et al. |
| 7,134,729 B2 | 11/2006 | Dowty et al. |
| 7,137,341 B2 | 11/2006 | Shilliday et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,245 B2 | 12/2006 | Flörsheimer et al. |
| 7,147,251 B2 | 12/2006 | Bell et al. |
| 7,152,880 B1 | 12/2006 | Pang et al. |
| D535,214 S | 1/2007 | Kolasa |
| 7,159,285 B2 | 1/2007 | Karlsson |

(56) References Cited

U.S. PATENT DOCUMENTS

| | | |
|---|---|---|
| 7,162,958 B2 | 1/2007 | Shilliday et al. |
| 7,163,236 B2 | 1/2007 | Masuda et al. |
| 7,172,213 B2 | 2/2007 | Kreuzer et al. |
| 7,180,258 B2 | 2/2007 | Specht et al. |
| 7,182,370 B2 | 2/2007 | Arnold |
| 7,188,567 B1 | 3/2007 | Italiane et al. |
| 7,192,056 B2 | 3/2007 | Noda |
| 7,198,285 B2 | 4/2007 | Hochstein-Lenzen |
| 7,198,293 B2 | 4/2007 | Olson |
| 7,210,707 B2 | 5/2007 | Schroth |
| 7,213,832 B2 | 5/2007 | Hayashi |
| 7,213,836 B2 | 5/2007 | Coon et al. |
| 7,216,827 B2 | 5/2007 | Tanaka et al. |
| 7,216,891 B2 | 5/2007 | Biglino |
| 7,216,892 B2 | 5/2007 | Baumbach et al. |
| 7,219,929 B2 | 5/2007 | Bell et al. |
| 7,222,877 B2 | 5/2007 | Wipasuramonton et al. |
| 7,226,131 B2 | 6/2007 | Meneses et al. |
| 7,232,154 B2 | 6/2007 | Desmarais et al. |
| 7,237,741 B2 | 7/2007 | Specht |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,261,319 B2 | 8/2007 | DePotte et al. |
| 7,263,750 B2 | 9/2007 | Keene et al. |
| 7,264,268 B2 | 9/2007 | Ehrke et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,275,763 B2 | 10/2007 | Thomas et al. |
| 7,278,656 B1 | 10/2007 | Kalandek |
| 7,278,684 B2 | 10/2007 | Boyle |
| 7,281,733 B2 | 10/2007 | Pieruch |
| 7,284,975 B2 | 10/2007 | Morita |
| D555,358 S | 11/2007 | King |
| 7,300,013 B2 | 11/2007 | Morgan et al. |
| 7,303,206 B2 | 12/2007 | Kippschull et al. |
| 7,306,260 B1 * | 12/2007 | Park ................ B60R 22/16 280/801.1 |
| 7,306,261 B2 | 12/2007 | Nomura |
| 7,318,599 B2 | 1/2008 | Magdun |
| 7,320,479 B2 | 1/2008 | Trevillyan et al. |
| 7,325,829 B2 | 2/2008 | Kelley et al. |
| 7,328,915 B2 | 2/2008 | Smith et al. |
| 7,341,216 B2 | 3/2008 | Heckmayr |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,357,410 B2 | 4/2008 | Soejima |
| 7,358,473 B2 | 4/2008 | Aoki et al. |
| 7,360,287 B2 | 4/2008 | Cerruti et al. |
| 7,360,791 B2 | 4/2008 | Yamada |
| 7,367,590 B2 | 5/2008 | Koning et al. |
| 7,374,206 B2 | 5/2008 | Nomura |
| 7,377,464 B2 | 5/2008 | Morgan |
| 7,380,740 B2 | 6/2008 | Tanaka et al. |
| 7,380,817 B2 | 6/2008 | Poli et al. |
| 7,384,014 B2 | 6/2008 | Ver Hoven et al. |
| 7,390,018 B2 | 6/2008 | Ridolfi et al. |
| 7,395,585 B2 | 7/2008 | Longley et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,239 B1 | 7/2008 | Walton et al. |
| 7,404,572 B2 | 7/2008 | Salmo et al. |
| 7,407,183 B2 | 8/2008 | Ford et al. |
| 7,407,193 B2 | 8/2008 | Yamaguchi et al. |
| 7,413,220 B2 | 8/2008 | Itoga et al. |
| 7,422,085 B2 | 9/2008 | Kitazawa |
| D578,931 S | 10/2008 | Toltzman et al. |
| 7,431,119 B2 | 10/2008 | Tanaka |
| 7,431,332 B2 | 10/2008 | Wipasuramonton et al. |
| 7,445,237 B2 | 11/2008 | Boyle, III et al. |
| 7,452,002 B2 | 11/2008 | Baumbach et al. |
| 7,452,003 B2 | 11/2008 | Bell |
| 7,452,030 B2 | 11/2008 | Yoshikawa et al. |
| 7,455,256 B2 | 11/2008 | Morgan |
| 7,458,607 B2 | 12/2008 | Abe et al. |
| 7,461,866 B2 | 12/2008 | Desmarais et al. |
| 7,469,853 B2 | 12/2008 | Nomura |
| 7,475,840 B2 | 1/2009 | Heckmayr |
| 7,475,909 B2 | 1/2009 | Takao et al. |
| 7,477,139 B1 | 1/2009 | Cuevas |
| 7,481,399 B2 | 1/2009 | Nöhren et al. |
| 7,481,452 B2 | 1/2009 | Itoga et al. |
| 7,497,462 B2 | 3/2009 | Sakai et al. |
| 7,497,469 B2 | 3/2009 | Fischer et al. |
| 7,506,413 B2 | 3/2009 | Dingman et al. |
| 7,506,891 B2 | 3/2009 | Quioc et al. |
| 7,513,524 B2 | 4/2009 | Oota et al. |
| 7,516,808 B2 | 4/2009 | Tanaka |
| 7,520,036 B2 | 4/2009 | Baldwin et al. |
| D592,543 S | 5/2009 | Kolasa |
| D592,830 S | 5/2009 | Whiteside |
| 7,533,897 B1 | 5/2009 | Xu et al. |
| 7,533,902 B2 | 5/2009 | Arnold et al. |
| 7,533,903 B2 | 5/2009 | Takai et al. |
| 7,547,043 B2 | 6/2009 | Kokeguchi et al. |
| 7,549,674 B2 | 6/2009 | Yoshikawa et al. |
| 7,556,312 B2 | 7/2009 | Yoshikawa et al. |
| 7,557,052 B2 | 7/2009 | Konishi et al. |
| 7,559,605 B2 | 7/2009 | Yoshikawa et al. |
| 7,571,928 B2 | 8/2009 | Soejima |
| 7,594,675 B2 | 9/2009 | Bostrom et al. |
| 7,600,600 B2 | 10/2009 | Inuzuka et al. |
| 7,600,782 B2 | 10/2009 | Ishiguro et al. |
| 7,604,251 B2 | 10/2009 | Soejima |
| 7,607,690 B2 | 10/2009 | Abe et al. |
| D603,753 S | 11/2009 | Palmer et al. |
| 7,611,195 B2 | 11/2009 | Yoshikawa et al. |
| 7,614,124 B2 | 11/2009 | Keene et al. |
| 7,614,652 B2 | 11/2009 | Aoki et al. |
| 7,614,653 B2 | 11/2009 | Rose et al. |
| 7,625,008 B2 | 12/2009 | Pang et al. |
| 7,628,357 B2 | 12/2009 | Mercier et al. |
| 7,630,804 B2 | 12/2009 | Aoki et al. |
| 7,631,720 B2 | 12/2009 | Takao et al. |
| 7,631,830 B2 | 12/2009 | Boelstler et al. |
| 7,641,233 B2 | 1/2010 | Korechika |
| 7,648,167 B2 | 1/2010 | Bouquier et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,669,794 B2 | 3/2010 | Boelstler et al. |
| 7,669,897 B2 | 3/2010 | Sano |
| 7,673,945 B1 | 3/2010 | Riffel et al. |
| 7,681,683 B2 | 3/2010 | Takao et al. |
| 7,681,914 B2 | 3/2010 | Maidel et al. |
| 7,681,917 B2 | 3/2010 | Guillo et al. |
| 7,698,791 B2 | 4/2010 | Pezza |
| 7,703,796 B2 | 4/2010 | Manire et al. |
| 7,708,312 B2 | 5/2010 | Kalandek |
| 7,712,567 B2 | 5/2010 | Tanaka et al. |
| 7,716,794 B2 | 5/2010 | Wu |
| 7,716,795 B2 | 5/2010 | Versellie et al. |
| 7,717,215 B2 | 5/2010 | Tanaka |
| 7,717,217 B2 | 5/2010 | Aoki et al. |
| 7,722,079 B2 | 5/2010 | Lee et al. |
| 7,722,081 B2 | 5/2010 | Van Druff et al. |
| 7,726,685 B2 | 6/2010 | Kumagai et al. |
| 7,739,019 B2 | 6/2010 | Robert et al. |
| 7,740,274 B2 | 6/2010 | Manssart |
| 7,753,158 B2 | 7/2010 | Takao et al. |
| 7,753,401 B2 | 7/2010 | Matura et al. |
| 7,753,402 B2 | 7/2010 | Volkmann et al. |
| 7,753,410 B2 | 7/2010 | Coultrup |
| 7,775,557 B2 | 8/2010 | Boström et al. |

(56) References Cited

U.S. PATENT DOCUMENTS

| | | |
|---|---|---|
| 7,784,865 B2 | 8/2010 | Yoshikawa et al. |
| 7,789,417 B2 | 9/2010 | Yoshikawa et al. |
| 7,789,418 B2 | 9/2010 | Wipasuramonton et al. |
| 7,794,024 B1 | 9/2010 | Kranz et al. |
| 7,798,522 B2 | 9/2010 | Itoga |
| RE41,790 E | 10/2010 | Stanley |
| 7,806,428 B2 | 10/2010 | Yoshikawa et al. |
| 7,836,994 B2 | 11/2010 | Tanaka |
| 7,837,223 B2 | 11/2010 | Shilliday et al. |
| 7,841,655 B2 | 11/2010 | Yoshikawa et al. |
| 7,845,676 B2 | 12/2010 | Ohhashi |
| 7,845,678 B2 | 12/2010 | Pausch et al. |
| 7,845,681 B2 | 12/2010 | Abe et al. |
| 7,847,229 B2 | 12/2010 | Aoki et al. |
| 7,857,347 B2 | 12/2010 | Abe et al. |
| 7,861,341 B2 | 1/2011 | Ayette et al. |
| 7,862,124 B2 | 1/2011 | Dingman |
| 7,871,132 B2 | 1/2011 | Rogers |
| 7,874,583 B2 | 1/2011 | Sahm et al. |
| 7,874,590 B1 | 1/2011 | Schubert et al. |
| D632,611 S | 2/2011 | Buscart |
| 7,878,538 B2 | 2/2011 | Abe et al. |
| 7,883,106 B2 | 2/2011 | Mical |
| 7,883,109 B2 | 2/2011 | Parks et al. |
| 7,922,197 B2 | 4/2011 | Fukawatase et al. |
| 7,931,297 B2 | 4/2011 | Abe et al. |
| D637,518 S | 5/2011 | Chen |
| 7,934,775 B2 | 5/2011 | Walker et al. |
| 7,945,975 B2 | 5/2011 | Thomas et al. |
| 7,946,375 B2 | 5/2011 | Tanaka |
| 7,954,847 B2 | 6/2011 | Ohhashi |
| 7,954,850 B2 | 6/2011 | Fischer et al. |
| 7,963,614 B2 | 6/2011 | Kranz et al. |
| 7,976,058 B2 | 7/2011 | Suzuki et al. |
| 7,978,881 B2 | 7/2011 | Aoki et al. |
| 7,980,590 B2 | 7/2011 | Foubert et al. |
| 7,982,590 B2 | 7/2011 | Aoki et al. |
| 7,992,934 B2 | 8/2011 | Cailleteau |
| 7,997,611 B2 | 8/2011 | Dufaut et al. |
| 8,011,730 B2 | 9/2011 | Greenwood |
| 8,020,889 B2 | 9/2011 | Bauer et al. |
| 8,020,891 B2 | 9/2011 | Fukawatase et al. |
| 8,020,894 B2 | 9/2011 | Marriott |
| 8,037,581 B2 | 10/2011 | Gray et al. |
| 8,059,867 B2 | 11/2011 | Aoki |
| 8,070,183 B2 | 12/2011 | Kumagai et al. |
| 8,096,027 B2 | 1/2012 | Jung et al. |
| 8,152,199 B2 | 4/2012 | Bauer et al. |
| 8,210,566 B2 | 7/2012 | Fukawatase et al. |
| 8,240,012 B2 | 8/2012 | Walega et al. |
| 8,240,767 B2 | 8/2012 | Greenwood |
| 8,256,073 B2 | 9/2012 | Zhang |
| 8,262,130 B2 | 9/2012 | Fischer et al. |
| 8,267,424 B2 | 9/2012 | Tomitaka et al. |
| 8,272,664 B2 | 9/2012 | Benny et al. |
| 8,292,324 B2 | 10/2012 | Oigawa et al. |
| 8,353,532 B2 | 1/2013 | Abe et al. |
| 8,375,530 B2 | 2/2013 | Walega et al. |
| 8,381,373 B2 | 2/2013 | Jung |
| 8,382,154 B2 | 2/2013 | Suzuki et al. |
| 8,387,216 B1 | 3/2013 | Martinson |
| 8,408,494 B2 | 4/2013 | Garcia et al. |
| 8,414,018 B2 | 4/2013 | Choi et al. |
| 8,419,054 B2 | 4/2013 | Abe et al. |
| 8,434,786 B2 | 5/2013 | Jang et al. |
| 8,439,398 B2 | 5/2013 | Baca |
| 8,457,845 B2 | 6/2013 | Takao et al. |
| 8,466,579 B2 | 6/2013 | Petitpierre |
| 8,468,660 B2 | 6/2013 | Holler |
| 8,469,396 B2 | 6/2013 | Rathmann-ramlow et al. |
| 8,480,127 B2 | 7/2013 | Rathmann-ramlow et al. |
| 8,500,163 B2 | 8/2013 | Mallinger et al. |
| 8,523,220 B1 | 9/2013 | Gehret et al. |
| 8,528,932 B2 | 9/2013 | Islam et al. |
| 8,540,275 B2 | 9/2013 | Kokeguchi |
| 8,556,291 B2 | 10/2013 | Islam et al. |
| 8,567,022 B2 | 10/2013 | Keene et al. |
| 8,573,642 B2 | 11/2013 | Suzuki et al. |
| 8,579,324 B2 | 11/2013 | Kwon et al. |
| 8,579,378 B2 | 11/2013 | Marais et al. |
| 8,608,197 B2 | 12/2013 | Hofmann et al. |
| 8,627,554 B1 | 1/2014 | Hagan et al. |
| 8,641,096 B1 * | 2/2014 | Kohlndorfer ............ B60R 22/28 280/805 |
| 8,646,808 B2 | 2/2014 | Williams et al. |
| 8,651,521 B2 | 2/2014 | Kühne et al. |
| 8,657,334 B2 | 2/2014 | Mallinger et al. |
| 8,672,349 B2 | 3/2014 | Mendez et al. |
| 8,684,403 B2 | 4/2014 | Boyle et al. |
| 8,684,404 B2 | 4/2014 | Fischer et al. |
| 8,684,407 B2 | 4/2014 | Fischer et al. |
| 8,690,188 B2 | 4/2014 | Fiore |
| 8,690,254 B2 | 4/2014 | Cailleteau |
| 8,702,121 B2 | 4/2014 | Yamashita et al. |
| 8,714,589 B2 | 5/2014 | Santana-gallego et al. |
| 8,727,061 B2 | 5/2014 | Rydsmo |
| 8,727,377 B2 | 5/2014 | Wang et al. |
| 8,727,378 B2 | 5/2014 | Hiruta et al. |
| 8,740,244 B2 | 6/2014 | Obadia |
| 8,746,735 B2 | 6/2014 | Meister et al. |
| 8,746,736 B2 | 6/2014 | Mendez et al. |
| 8,851,511 B1 | 10/2014 | Volkmann et al. |
| 8,851,568 B2 | 10/2014 | Funk et al. |
| 8,882,141 B2 | 11/2014 | Arnold et al. |
| 8,882,143 B2 | 11/2014 | Potter et al. |
| 8,888,126 B2 | 11/2014 | Nukaya et al. |
| 8,894,095 B1 | 11/2014 | Meister et al. |
| 8,911,013 B2 | 12/2014 | Reinck |
| 8,919,811 B2 | 12/2014 | Langer et al. |
| 8,939,465 B2 | 1/2015 | Kastelic et al. |
| 8,944,461 B2 | 2/2015 | Islam et al. |
| 8,955,914 B2 | 2/2015 | Meister et al. |
| 8,996,242 B2 | 3/2015 | Glueck et al. |
| D729,119 S | 5/2015 | Janes |
| 9,027,962 B1 | 5/2015 | Jang |
| 9,033,412 B2 | 5/2015 | Reinck |
| 9,038,946 B2 | 5/2015 | Hawkins et al. |
| 9,061,765 B2 | 6/2015 | Vazquez et al. |
| 9,067,681 B2 | 6/2015 | Cailleteau |
| 9,079,559 B2 | 7/2015 | Iwamoto et al. |
| 9,096,193 B2 | 8/2015 | Kalandek |
| 9,108,590 B2 | 8/2015 | Williams et al. |
| 9,126,510 B2 | 9/2015 | Hirako |
| 9,139,114 B2 | 9/2015 | Meister et al. |
| 9,174,603 B2 | 11/2015 | Fischer et al. |
| 9,187,056 B1 | 11/2015 | Kwon |
| 9,199,602 B1 | 12/2015 | Fischer et al. |
| 9,227,535 B2 | 1/2016 | Coman et al. |
| 9,227,592 B2 | 1/2016 | Polcwiartek et al. |
| 9,242,737 B2 | 1/2016 | Islam et al. |
| D748,529 S | 2/2016 | Paik et al. |
| 9,272,685 B2 | 3/2016 | Fischer et al. |
| 9,283,912 B2 | 3/2016 | Glück et al. |
| 9,296,317 B2 | 3/2016 | Meister et al. |
| 9,315,271 B2 | 4/2016 | Oleson et al. |
| 9,327,674 B2 | 5/2016 | Fischer et al. |
| 9,333,939 B2 | 5/2016 | Murakami et al. |
| 9,340,177 B2 | 5/2016 | Hiruta et al. |
| 9,352,721 B2 | 5/2016 | Jang |
| 9,376,081 B2 | 6/2016 | Choi |
| 9,376,086 B2 | 6/2016 | Burger et al. |
| 9,393,924 B2 | 7/2016 | Choi |
| 9,403,503 B2 | 8/2016 | Buchholz et al. |
| 9,428,132 B2 | 8/2016 | Obadia et al. |
| 9,434,345 B2 | 9/2016 | Koshikawa et al. |
| 9,434,346 B2 | 9/2016 | Hoffmann et al. |
| 9,475,451 B2 | 10/2016 | Kwon |
| 9,499,119 B2 | 11/2016 | Ishiguro et al. |
| 9,527,468 B2 | 12/2016 | Vasseur et al. |
| 9,555,726 B2 | 1/2017 | Jafri et al. |
| 9,555,764 B2 | 1/2017 | Maruoka et al. |
| 9,561,775 B2 | 2/2017 | Kim et al. |
| 9,573,556 B2 | 2/2017 | Ko et al. |
| 9,598,042 B2 | 3/2017 | Schneider et al. |

(56) References Cited

U.S. PATENT DOCUMENTS

| | | |
|---|---|---|
| 9,616,839 B2 | 4/2017 | Khouphongsy et al. |
| 9,630,719 B2 | 4/2017 | Hawkins et al. |
| 9,650,012 B2 | 5/2017 | Fukurono et al. |
| 9,656,752 B2 * | 5/2017 | Valdes .............. B64D 11/062 |
| 9,745,065 B2 | 8/2017 | Santana-gallego et al. |
| 9,821,913 B1 * | 11/2017 | Deevey ............ B64D 11/06205 |
| 9,828,100 B2 | 11/2017 | Wyss |
| 9,856,024 B2 | 1/2018 | Burd |
| 9,873,405 B2 | 1/2018 | Chandrakeerth |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0050707 A1 * | 5/2002 | Nishide .................. B60R 22/22 |
| | | 280/801.1 |
| 2002/0067031 A1 | 6/2002 | Busgen et al. |
| 2002/0089152 A1 | 7/2002 | Khoudari et al. |
| 2002/0089163 A1 | 7/2002 | Bedewi et al. |
| 2002/0101067 A1 | 8/2002 | Breed |
| 2002/0125700 A1 | 9/2002 | Adkisson |
| 2002/0125701 A1 | 9/2002 | Devonport |
| 2002/0125705 A1 | 9/2002 | Wong et al. |
| 2002/0135175 A1 | 9/2002 | Schroth |
| 2002/0140209 A1 | 10/2002 | Waid et al. |
| 2002/0145279 A1 | 10/2002 | Murray |
| 2002/0167207 A1 | 11/2002 | Larson |
| 2002/0171233 A1 | 11/2002 | Grace |
| 2003/0015863 A1 | 1/2003 | Brown et al. |
| 2003/0027917 A1 | 2/2003 | Namiki et al. |
| 2003/0085608 A1 | 5/2003 | Girardin |
| 2003/0116946 A1 | 6/2003 | Roos |
| 2003/0168837 A1 | 9/2003 | Schneider et al. |
| 2003/0178821 A1 | 9/2003 | Schneider et al. |
| 2004/0051280 A1 | 3/2004 | Anaya et al. |
| 2004/0066291 A1 | 4/2004 | Tracy et al. |
| 2004/0084953 A1 | 5/2004 | Hansen |
| 2004/0108708 A1 | 6/2004 | Noda |
| 2004/0164525 A1 | 8/2004 | Gray et al. |
| 2004/0164532 A1 | 8/2004 | Heidorn et al. |
| 2004/0169411 A1 | 9/2004 | Murray |
| 2004/0174063 A1 | 9/2004 | Kocher |
| 2004/0178614 A1 | 9/2004 | Countryman et al. |
| 2004/0188988 A1 | 9/2004 | Wipasuramonton et al. |
| 2004/0217583 A1 | 11/2004 | Wang |
| 2004/0227390 A1 | 11/2004 | Schroth |
| 2004/0245749 A1 | 12/2004 | Goujon |
| 2004/0251367 A1 | 12/2004 | Suzuki et al. |
| 2004/0262892 A1 | 12/2004 | Soejima |
| 2005/0006884 A1 | 1/2005 | Cooper et al. |
| 2005/0052002 A1 | 3/2005 | Hayashi et al. |
| 2005/0073187 A1 | 4/2005 | Frank et al. |
| 2005/0098990 A1 | 5/2005 | Pinsenschaum et al. |
| 2005/0107932 A1 | 5/2005 | Bolz et al. |
| 2005/0127660 A1 | 6/2005 | Liu |
| 2005/0127740 A1 | 6/2005 | Dowty |
| 2005/0146119 A1 | 7/2005 | Ford et al. |
| 2005/0151405 A1 | 7/2005 | Dowty et al. |
| 2005/0175253 A1 | 8/2005 | Li et al. |
| 2005/0179244 A1 | 8/2005 | Schroth |
| 2005/0184492 A1 | 8/2005 | Shilliday et al. |
| 2005/0200049 A1 | 9/2005 | Soejima |
| 2005/0206151 A1 | 9/2005 | Ashline |
| 2005/0212270 A1 | 9/2005 | Wipasuramonton et al. |
| 2005/0218635 A1 | 10/2005 | Wipasuramonton et al. |
| 2005/0236828 A1 | 10/2005 | Noda et al. |
| 2005/0248135 A1 | 11/2005 | Poli et al. |
| 2005/0275197 A1 | 12/2005 | Kaifuki et al. |
| 2005/0284977 A1 | 12/2005 | Specht et al. |
| 2006/0049617 A1 | 3/2006 | Mowry et al. |
| 2006/0071535 A1 | 4/2006 | Kim et al. |
| 2006/0075609 A1 | 4/2006 | Dingman et al. |
| 2006/0090313 A1 | 5/2006 | Muromachi et al. |
| 2006/0091251 A1 | 5/2006 | Nomura |
| 2006/0097095 A1 | 5/2006 | Boast |
| 2006/0097099 A1 | 5/2006 | Nomura |
| 2006/0108775 A1 | 5/2006 | Schirholz et al. |
| 2006/0113419 A1 | 6/2006 | Nomura |
| 2006/0113420 A1 | 6/2006 | Nomura |
| 2006/0113757 A1 | 6/2006 | Romeo et al. |
| 2006/0119084 A1 | 6/2006 | Coon et al. |
| 2006/0138759 A1 | 6/2006 | Aoki et al. |
| 2006/0175453 A1 | 8/2006 | Takao et al. |
| 2006/0175816 A1 | 8/2006 | Spencer et al. |
| 2006/0186644 A1 | 8/2006 | Manire et al. |
| 2006/0192372 A1 | 8/2006 | Khouri |
| 2006/0220360 A1 | 10/2006 | Ridolfi et al. |
| 2006/0220368 A1 | 10/2006 | Takao et al. |
| 2006/0231664 A1 | 10/2006 | Takao et al. |
| 2006/0232049 A1 | 10/2006 | Abe |
| 2006/0237570 A1 | 10/2006 | Takao et al. |
| 2006/0237573 A1 | 10/2006 | Boelstler et al. |
| 2006/0243070 A1 | 11/2006 | Van Druff et al. |
| 2006/0255569 A1 | 11/2006 | Weissert et al. |
| 2006/0255570 A1 | 11/2006 | Wipasuramonton et al. |
| 2006/0267325 A1 | 11/2006 | Kumagai et al. |
| 2006/0267394 A1 | 11/2006 | David et al. |
| 2006/0277727 A1 | 12/2006 | Keene et al. |
| 2006/0278119 A1 | 12/2006 | Shilliday et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0046015 A1 | 3/2007 | Tanaka et al. |
| 2007/0052255 A1 | 3/2007 | O'Connor |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0080528 A1 | 4/2007 | Itoga et al. |
| 2007/0085309 A1 | 4/2007 | Kelley et al. |
| 2007/0102909 A1 | 5/2007 | Nezaki et al. |
| 2007/0108753 A1 | 5/2007 | Pang et al. |
| 2007/0114775 A1 | 5/2007 | Inuzuka et al. |
| 2007/0123128 A1 | 5/2007 | Shimazaki et al. |
| 2007/0138775 A1 | 6/2007 | Rossbach et al. |
| 2007/0138776 A1 | 6/2007 | Rossbach et al. |
| 2007/0144810 A1 | 6/2007 | Tanaka et al. |
| 2007/0144811 A1 | 6/2007 | Tanaka et al. |
| 2007/0152428 A1 | 7/2007 | Poli et al. |
| 2007/0170710 A1 | 7/2007 | Bouquier |
| 2007/0170717 A1 | 7/2007 | Dirassuian |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0229661 A1 | 10/2007 | Aoki et al. |
| 2007/0229662 A1 | 10/2007 | Aoki et al. |
| 2007/0241223 A1 | 10/2007 | Boelstler et al. |
| 2007/0241549 A1 | 10/2007 | Boelstler et al. |
| 2007/0246922 A1 | 10/2007 | Manssart |
| 2007/0257480 A1 | 11/2007 | Van Druff et al. |
| 2007/0289799 A1 | 12/2007 | Aoki et al. |
| 2007/0289800 A1 | 12/2007 | Aoki et al. |
| 2008/0018086 A1 | 1/2008 | Ford et al. |
| 2008/0018088 A1 | 1/2008 | Gray |
| 2008/0018156 A1 | 1/2008 | Hammarskjold et al. |
| 2008/0030013 A1 | 2/2008 | Burghardt |
| 2008/0030312 A1 | 2/2008 | Aoki |
| 2008/0042416 A1 | 2/2008 | Razazi et al. |
| 2008/0054602 A1 | 3/2008 | Yang |
| 2008/0054615 A1 | 3/2008 | Coultrup |
| 2008/0084050 A1 | 4/2008 | Volkmann et al. |
| 2008/0087754 A1 | 4/2008 | Aihara et al. |
| 2008/0088118 A1 | 4/2008 | Wipasuramonton et al. |
| 2008/0093833 A1 | 4/2008 | Odate |
| 2008/0100051 A1 | 5/2008 | Bell et al. |
| 2008/0100122 A1 | 5/2008 | Bell et al. |
| 2008/0106074 A1 | 5/2008 | Ford |
| 2008/0136246 A1 | 6/2008 | Salter |
| 2008/0172847 A1 | 7/2008 | Keene et al. |
| 2008/0224460 A1 | 9/2008 | Erez |
| 2008/0255731 A1 | 10/2008 | Mita et al. |
| 2008/0315567 A1 | 12/2008 | Fischer et al. |
| 2009/0014991 A1 | 1/2009 | Smyth et al. |
| 2009/0020032 A1 | 1/2009 | Trevillyan |
| 2009/0020197 A1 | 1/2009 | Hosey |

(56) References Cited

U.S. PATENT DOCUMENTS

| | | |
|---|---|---|
| 2009/0051149 A1 | 2/2009 | Kalandek et al. |
| 2009/0051150 A1 | 2/2009 | Murakami |
| 2009/0056475 A1 | 3/2009 | Grabowski |
| 2009/0058052 A1 | 3/2009 | Ford et al. |
| 2009/0066063 A1 | 3/2009 | Mical |
| 2009/0069983 A1 | 3/2009 | Humbert et al. |
| 2009/0111341 A1 | 4/2009 | Rodriguez |
| 2009/0179412 A1 | 7/2009 | Gray et al. |
| 2009/0183348 A1 | 7/2009 | Walton et al. |
| 2009/0212549 A1 | 8/2009 | Jones |
| 2009/0236828 A1 | 9/2009 | Foubert et al. |
| 2009/0241305 A1 | 10/2009 | Buckingham |
| 2009/0289479 A1 | 11/2009 | Kumagai et al. |
| 2010/0046843 A1 | 2/2010 | Ma et al. |
| 2010/0066060 A1 | 3/2010 | Kalandek |
| 2010/0084840 A1 | 4/2010 | Ohlsson et al. |
| 2010/0102542 A1 | 4/2010 | Nakajima et al. |
| 2010/0115737 A1 | 5/2010 | Foubert |
| 2010/0117438 A1 | 5/2010 | Takao et al. |
| 2010/0121533 A1 | 5/2010 | Takao et al. |
| 2010/0125983 A1 | 5/2010 | Keene et al. |
| 2010/0146749 A1 | 6/2010 | Jung |
| 2010/0164208 A1 | 7/2010 | Kalandek |
| 2010/0213753 A1 | 8/2010 | Humbert |
| 2010/0219667 A1 | 9/2010 | Merrill et al. |
| 2010/0276540 A1 | 11/2010 | Rojo |
| 2011/0010901 A1 | 1/2011 | Holler |
| 2011/0031723 A1 | 2/2011 | Fischer et al. |
| 2011/0043402 A1 | 2/2011 | Sasakawa |
| 2011/0057500 A1 | 3/2011 | Walker et al. |
| 2011/0108666 A1 | 5/2011 | Pozzi et al. |
| 2011/0133439 A1* | 6/2011 | Pearce .................... B60R 22/28 280/805 |
| 2011/0162175 A1 | 7/2011 | Gnesda et al. |
| 2011/0285115 A1 | 11/2011 | Putala et al. |
| 2012/0038137 A1 | 2/2012 | Wipasuramonton et al. |
| 2012/0074677 A1 | 3/2012 | Hiruta et al. |
| 2012/0091764 A1 | 4/2012 | Cailleteau et al. |
| 2012/0242134 A1 | 9/2012 | Siegel |
| 2012/0256399 A1 | 10/2012 | Kokeguchi |
| 2012/0256403 A1 | 10/2012 | Shields |
| 2012/0261911 A1 | 10/2012 | Baca et al. |
| 2012/0284966 A1 | 11/2012 | Greaves et al. |
| 2012/0292893 A1 | 11/2012 | Baca et al. |
| 2013/0009430 A1 | 1/2013 | Islam et al. |
| 2013/0015642 A1 | 1/2013 | Islam et al. |
| 2013/0015686 A1 | 1/2013 | Islam et al. |
| 2013/0026803 A1 | 1/2013 | Islam et al. |
| 2013/0075524 A1 | 3/2013 | Islam et al. |
| 2013/0088056 A1 | 4/2013 | Quatanens et al. |
| 2013/0093221 A1 | 4/2013 | Ligonniere et al. |
| 2013/0106080 A1 | 5/2013 | Jarboe et al. |
| 2013/0127229 A1 | 5/2013 | Humbert |
| 2013/0134697 A1 | 5/2013 | Choi et al. |
| 2013/0147242 A1* | 6/2013 | Santana-Gallego ........................ B60R 21/23138 297/216.12 |
| 2013/0187646 A1 | 7/2013 | Baca et al. |
| 2013/0197746 A1 | 8/2013 | Glueck et al. |
| 2013/0212845 A1 | 8/2013 | Ford et al. |
| 2013/0221644 A1 | 8/2013 | Beattie et al. |
| 2013/0241180 A1 | 9/2013 | Gehret et al. |
| 2013/0307279 A1 | 11/2013 | De Morais et al. |
| 2014/0027574 A1 | 1/2014 | Obadia et al. |
| 2014/0077478 A1 | 3/2014 | Islam et al. |
| 2014/0159356 A1 | 6/2014 | Kastelic et al. |
| 2014/0230202 A1 | 8/2014 | Humbert et al. |
| 2015/0014969 A1 | 1/2015 | Choi |
| 2015/0042078 A1* | 2/2015 | Gehret ................ B64D 11/062 280/728.2 |
| 2015/0123385 A1 | 5/2015 | Frelsler et al. |
| 2015/0232184 A1 | 8/2015 | Gehret et al. |
| 2015/0321763 A1 | 11/2015 | Brel et al. |
| 2015/0375844 A1 | 12/2015 | Smithson et al. |
| 2016/0001735 A1 | 1/2016 | Quatanens et al. |
| 2016/0052636 A1 | 2/2016 | Moeller et al. |
| 2016/0096627 A1 | 4/2016 | Gehret et al. |
| 2016/0244173 A1 | 8/2016 | Deevey et al. |
| 2016/0272092 A1 | 9/2016 | Obadia et al. |
| 2016/0288756 A1 | 10/2016 | Ishiguro et al. |
| 2016/0318612 A1 | 11/2016 | Deevey et al. |
| 2017/0008632 A1* | 1/2017 | Eberle ............... B64D 11/0619 |
| 2017/0021930 A1 | 1/2017 | Henshaw |
| 2017/0028960 A1 | 2/2017 | Kobayashi et al. |
| 2017/0072897 A1 | 3/2017 | Kruse et al. |
| 2017/0088087 A1 | 3/2017 | Williams |
| 2017/0129445 A1 | 5/2017 | Kim |
| 2017/0197578 A1 | 7/2017 | Hatfield |
| 2017/0203844 A1 | 7/2017 | Hawkins et al. |
| 2017/0203847 A1* | 7/2017 | Browning ............... B64D 25/02 |
| 2017/0225649 A1* | 8/2017 | Jaradi ................. B60R 22/1952 |
| 2017/0225788 A1 | 8/2017 | Humbert |
| 2017/0240285 A1* | 8/2017 | Strobl ............. B64D 11/06205 |
| 2017/0283079 A1 | 10/2017 | Meadows et al. |
| 2017/0283086 A1 | 10/2017 | Garing et al. |

FOREIGN PATENT DOCUMENTS

| | | |
|---|---|---|
| CA | 2091526 A1 | 10/1993 |
| CA | 2112960 C | 12/2002 |
| CA | 2450744 A1 | 2/2003 |
| CN | 1351710 A | 5/2002 |
| CN | 1750966 A | 3/2006 |
| DE | 4019402 A1 | 12/1991 |
| DE | 4019596 A1 | 1/1992 |
| DE | 4116162 A1 | 11/1992 |
| DE | 4211209 A1 | 10/1993 |
| DE | 4329275 A1 | 3/1995 |
| DE | 69019765 T2 | 7/1995 |
| DE | 4421688 C1 | 12/1995 |
| DE | 19742151 A1 | 4/1998 |
| DE | 10041042 A1 | 5/2001 |
| EP | 1509409 B1 | 0/7200 |
| EP | 0026564 A1 | 4/1981 |
| EP | 0254383 A2 | 1/1988 |
| EP | 0363062 A2 | 4/1990 |
| EP | 0380442 A2 | 8/1990 |
| EP | 0401455 A1 | 12/1990 |
| EP | 0404730 A1 | 12/1990 |
| EP | 0449772 A1 | 10/1991 |
| EP | 0519296 A1 | 12/1992 |
| EP | 0561274 A1 | 9/1993 |
| EP | 0608564 A1 | 8/1994 |
| EP | 0639481 A1 | 2/1995 |
| EP | 0684168 A1 | 11/1995 |
| EP | 0765780 A1 | 4/1997 |
| EP | 0688702 B1 | 9/1999 |
| EP | 1022198 A1 | 7/2000 |
| EP | 1101660 A1 | 5/2001 |
| EP | 1159165 B1 | 9/2002 |
| EP | 0896909 B1 | 1/2003 |
| EP | 0962363 B1 | 7/2003 |
| EP | 1100701 B1 | 3/2004 |
| EP | 1447021 A1 | 8/2004 |
| EP | 0957009 B1 | 9/2004 |
| EP | 1279574 B1 | 12/2004 |
| EP | 0907529 B1 | 1/2005 |
| EP | 0901432 B1 | 2/2005 |
| EP | 1512587 A1 | 3/2005 |
| EP | 1131231 B1 | 8/2005 |
| EP | 1203703 B1 | 9/2005 |
| EP | 1309476 B1 | 10/2005 |
| EP | 1582423 A2 | 10/2005 |
| EP | 1363813 B1 | 12/2005 |
| EP | 1607278 A1 | 12/2005 |
| EP | 1614591 A2 | 1/2006 |
| EP | 1623814 A2 | 2/2006 |
| EP | 1642788 A2 | 4/2006 |
| EP | 1493637 B1 | 5/2006 |
| EP | 1522466 B1 | 8/2006 |
| EP | 1707455 A2 | 10/2006 |
| EP | 1712427 A1 | 10/2006 |
| EP | 1712435 A2 | 10/2006 |
| EP | 1712436 A2 | 10/2006 |

(56) References Cited

FOREIGN PATENT DOCUMENTS

| | | |
|---|---|---|
| EP | 1493548 B1 | 11/2006 |
| EP | 1658206 B1 | 1/2007 |
| EP | 1738978 A1 | 1/2007 |
| EP | 1749717 A1 | 2/2007 |
| EP | 1577173 B1 | 3/2007 |
| EP | 1767396 A1 | 3/2007 |
| EP | 1790540 A1 | 5/2007 |
| EP | 1666314 B1 | 6/2007 |
| EP | 1666317 B1 | 6/2007 |
| EP | 1666316 B1 | 7/2007 |
| EP | 1803615 A2 | 7/2007 |
| EP | 1666315 B1 | 8/2007 |
| EP | 1666318 B1 | 8/2007 |
| EP | 1818685 A1 | 8/2007 |
| EP | 1818686 A1 | 8/2007 |
| EP | 1621415 B1 | 9/2007 |
| EP | 1842734 A2 | 10/2007 |
| EP | 1842743 A2 | 10/2007 |
| EP | 1870295 A1 | 12/2007 |
| EP | 1719701 B1 | 1/2008 |
| EP | 1884417 A1 | 2/2008 |
| EP | 1886882 A1 | 2/2008 |
| EP | 1736378 B1 | 4/2008 |
| EP | 1674347 B1 | 5/2008 |
| EP | 1690757 B1 | 6/2008 |
| EP | 1745994 B1 | 6/2008 |
| EP | 1747946 B1 | 6/2008 |
| EP | 1738977 B1 | 10/2008 |
| EP | 1759938 B1 | 10/2008 |
| EP | 1980452 A1 | 10/2008 |
| EP | 1985505 A2 | 10/2008 |
| EP | 1777127 B1 | 11/2008 |
| EP | 2003027 A2 | 12/2008 |
| EP | 1655188 B1 | 2/2009 |
| EP | 2028103 A2 | 2/2009 |
| EP | 1652741 B1 | 4/2009 |
| EP | 1870296 B1 | 4/2009 |
| EP | 1655189 B1 | 7/2009 |
| EP | 1842739 B1 | 7/2009 |
| EP | 1842740 B1 | 7/2009 |
| EP | 1749716 B1 | 9/2009 |
| EP | 1746527 B1 | 10/2009 |
| EP | 0877674 B1 | 11/2009 |
| EP | 1671860 B1 | 11/2009 |
| EP | 1842737 B1 | 12/2009 |
| EP | 1842738 B1 | 12/2009 |
| EP | 1693254 B1 | 3/2010 |
| EP | 1566314 B1 | 5/2010 |
| EP | 1803616 B1 | 7/2010 |
| EP | 1975011 B1 | 10/2010 |
| EP | 1972510 B1 | 11/2010 |
| EP | 2275312 A1 | 1/2011 |
| EP | 0941180 B2 | 2/2011 |
| EP | 1724163 B1 | 3/2011 |
| EP | 1945597 B1 | 3/2011 |
| EP | 1712431 B1 | 6/2011 |
| EP | 2127941 B1 | 6/2011 |
| EP | 2003026 B1 | 7/2011 |
| EP | 2154068 B1 | 12/2011 |
| EP | 1842735 B1 | 8/2012 |
| EP | 1726494 B1 | 9/2012 |
| EP | 2543556 A1 | 1/2013 |
| EP | 2546111 A1 | 1/2013 |
| EP | 2546146 A1 | 1/2013 |
| EP | 2551196 A1 | 1/2013 |
| EP | 2572994 A2 | 3/2013 |
| EP | 2360066 B1 | 4/2013 |
| EP | 2581276 A1 | 4/2013 |
| EP | 1834846 B1 | 5/2013 |
| EP | 2620332 A1 | 7/2013 |
| EP | 2636597 A2 | 9/2013 |
| EP | 2543557 B1 | 4/2014 |
| EP | 2360067 B1 | 6/2014 |
| EP | 2596995 B1 | 9/2014 |
| EP | 2604479 B1 | 11/2014 |
| EP | 2543553 B1 | 3/2015 |
| EP | 1694818 B1 | 5/2015 |
| EP | 2918498 A1 | 9/2015 |
| EP | 2581276 B1 | 10/2015 |
| EP | 1699682 B1 | 11/2015 |
| EP | 2543556 B1 | 11/2015 |
| EP | 2572994 B1 | 4/2016 |
| EP | 2734445 B1 | 8/2016 |
| EP | 2637929 B1 | 12/2016 |
| EP | 2914460 B1 | 12/2016 |
| EP | 2874881 B1 | 3/2017 |
| EP | 3165459 A1 | 5/2017 |
| EP | 3003858 B1 | 9/2017 |
| EP | 2888132 B1 | 10/2017 |
| EP | 2892805 B1 | 11/2017 |
| FR | 1298012 A | 7/1962 |
| FR | 2703011 A1 | 9/1994 |
| FR | 2757465 B1 | 3/1999 |
| FR | 2757811 B1 | 3/1999 |
| FR | 2757546 B1 | 4/1999 |
| FR | 2766142 B1 | 10/1999 |
| FR | 2767763 B1 | 11/1999 |
| FR | 2776589 B1 | 5/2000 |
| FR | 2788026 B1 | 3/2001 |
| FR | 2791625 B1 | 6/2001 |
| FR | 2805505 B1 | 6/2002 |
| FR | 2804888 B1 | 10/2002 |
| FR | 2824030 B1 | 8/2003 |
| FR | 2824028 B1 | 10/2003 |
| FR | 2824029 B1 | 11/2003 |
| FR | 2827521 B1 | 12/2003 |
| FR | 2825054 B1 | 10/2004 |
| FR | 2855122 B1 | 8/2005 |
| FR | 2861670 B1 | 2/2006 |
| FR | 2855124 B1 | 5/2006 |
| FR | 2855125 B1 | 5/2006 |
| FR | 2845147 B1 | 9/2006 |
| FR | 2886913 B1 | 9/2007 |
| FR | 2885350 B1 | 12/2008 |
| FR | 2931403 B1 | 4/2010 |
| FR | 2951678 B1 | 10/2011 |
| FR | 2952613 B1 | 5/2012 |
| FR | 3013328 A1 | 5/2015 |
| FR | 2928624 B1 | 7/2016 |
| GB | 888436 A | 1/1962 |
| GB | 1047761 A | 11/1966 |
| GB | 1362672 A | 8/1974 |
| GB | 1582973 A | 1/1981 |
| GB | 2055952 A | 3/1981 |
| GB | 2306876 A | 5/1997 |
| GB | 2356890 A | 6/2001 |
| GB | 2368050 A | 4/2002 |
| GB | 2410009 A | 7/2005 |
| JP | 52055120 A | 5/1977 |
| JP | 63141852 A | 6/1988 |
| JP | 63247150 A | 10/1988 |
| JP | 63258239 A | 10/1988 |
| JP | 1083436 A | 3/1989 |
| JP | 6483436 | 3/1989 |
| JP | 10119611 A | 5/1998 |
| JP | 11189117 A | 7/1999 |
| JP | 2000142303 A | 5/2000 |
| JP | 2001138858 A | 5/2001 |
| JP | 2009001064 A | 1/2009 |
| JP | 2011051413 A | 3/2011 |
| JP | 2011126381 A | 6/2011 |
| JP | 2016222203 A | 12/2016 |
| WO | 1986003386 A | 6/1986 |
| WO | 8807947 A1 | 10/1988 |
| WO | 1997006983 A1 | 2/1997 |
| WO | 1997044215 A1 | 11/1997 |
| WO | 9813226 A1 | 4/1998 |
| WO | 9841426 A1 | 9/1998 |
| WO | 1999022968 A1 | 5/1999 |
| WO | 9939940 A1 | 8/1999 |
| WO | 9942336 A1 | 8/1999 |
| WO | 1999047390 A1 | 9/1999 |
| WO | 2000021798 A1 | 4/2000 |
| WO | 2000056600 A2 | 9/2000 |

(56) References Cited

FOREIGN PATENT DOCUMENTS

| | | |
|---|---|---|
| WO | 0100456 A1 | 1/2001 |
| WO | 2001021449 A1 | 3/2001 |
| WO | 2001059201 A1 | 8/2001 |
| WO | 0168413 A1 | 9/2001 |
| WO | 2001068417 A1 | 9/2001 |
| WO | 2002094612 A2 | 11/2002 |
| WO | 2003009717 A2 | 2/2003 |
| WO | 2003031238 A2 | 4/2003 |
| WO | 2003057540 A1 | 7/2003 |
| WO | 2004004507 A1 | 1/2004 |
| WO | 2004110825 A1 | 12/2004 |
| WO | 2005058632 A2 | 6/2005 |
| WO | 2005058633 A2 | 6/2005 |
| WO | 2005060599 A2 | 7/2005 |
| WO | 2005060793 A1 | 7/2005 |
| WO | 2005082682 A1 | 9/2005 |
| WO | 2006028822 A1 | 3/2006 |
| WO | 2006033870 A2 | 3/2006 |
| WO | 2006041859 | 4/2006 |
| WO | 2006060539 A1 | 6/2006 |
| WO | 2007084756 A2 | 7/2007 |
| WO | 2007087160 A1 | 8/2007 |
| WO | 2008045774 A2 | 4/2008 |
| WO | 2010027853 A1 | 3/2010 |
| WO | 2011028297 A1 | 3/2011 |
| WO | 2011060234 A1 | 5/2011 |
| WO | 2011074350 A1 | 6/2011 |
| WO | 2012064556 A1 | 5/2012 |
| WO | 2012073105 A1 | 6/2012 |
| WO | 2013012890 A1 | 1/2013 |
| WO | 2013019248 A2 | 2/2013 |
| WO | 2013128430 A1 | 9/2013 |
| WO | 2014014780 A2 | 1/2014 |
| WO | 2014024046 A2 | 2/2014 |
| WO | 2014080347 A1 | 5/2014 |
| WO | 2014204804 A1 | 12/2014 |
| WO | 2014205443 A1 | 12/2014 |
| WO | 2015061336 A2 | 4/2015 |
| WO | 2015073363 A1 | 5/2015 |
| WO | 2015075671 A1 | 5/2015 |
| WO | 2015118389 A1 | 8/2015 |
| WO | 2015145410 A2 | 10/2015 |
| WO | 2015170841 A1 | 11/2015 |
| WO | 2016004096 A2 | 1/2016 |
| WO | 2016032971 A1 | 3/2016 |
| WO | 2016040600 A1 | 3/2016 |
| WO | 2016041783 | 3/2016 |
| WO | 2017017278 | 7/2016 |
| WO | 2016137932 A1 | 9/2016 |
| WO | 2016149714 A2 | 9/2016 |
| WO | 2016191038 A2 | 12/2016 |
| WO | 2017008015 A1 | 1/2017 |
| WO | 2017017278 A1 | 2/2017 |
| WO | 2017173397 A1 | 10/2017 |
| WO | 2017176748 A1 | 10/2017 |
| WO | 2017185015 A1 | 10/2017 |
| WO | 2017214519 A1 | 12/2017 |

OTHER PUBLICATIONS

Federal Aviation Administration (FAA) policy statement PS-ANM-25-03, Technical Criteria for Approving Side-Facing Seats, dated Jun. 8, 2012.
Grierson et al., Simula's Line of Inflatable Restraint Technologies, TTCP Technical Report Proceedings of the Workshop: Inflatable Restraints in Aviation, May 2000, pp. 41-51.
Minicooper Manual dated 2006.
Renault Espce Manual dated 2002.
Global Seating Systems LLC, "CCOPS Cobra: Soldier Survival System," 1 page, undated.

* cited by examiner

OCCUPANT RESTRAINT SYSTEMS HAVING EXTENDING RESTRAINTS, AND ASSOCIATED SYSTEMS AND METHODS

CROSS-REFERENCE TO RELATED APPLICATION(S) INCORPORATED BY REFERENCE

The present application claims priority to and the benefit of U.S. Provisional Application Ser. No. 62/495,602, titled OCCUPANT RESTRAINT SYSTEMS HAVING EXTENDING RESTRAINTS, AND ASSOCIATED SYSTEMS AND METHODS, filed Jan. 20, 2016, and incorporated by reference herein in its entirety.

TECHNICAL FIELD

The following disclosure relates generally to occupant restraint systems for use in aircraft and other vehicles and, more particularly, to occupant restraint systems having restraints configured to extend in response to a dynamic event.

BACKGROUND

Various types of seat belt systems have been used to secure occupants in their seats in aircraft and other vehicles. Commercial aircraft, for example, typically use 2-point restraint systems (e.g., lap seat belts) to secure occupants in their seats. Airbag systems have also been used to protect passengers from strike hazards in automobiles, aircraft, and other vehicles. In automobiles, for example, airbags can be stowed in the steering column, dashboard, side panel, or other location. In the event of a collision or other dynamic event of sufficient magnitude, a sensor detects the event and transmits a corresponding signal to an initiation device (e.g., a pyrotechnic device) on an airbag inflator. This causes the inflator to release compressed gas into the airbag, rapidly inflating the airbag and deploying it in front of the driver or other occupant to protect them from impact injuries.

As noted above, commercial aircraft typically use lap seat belts to secure occupants in their seats. Conventional lap seat belts, however, do not stop the occupant's upper torso from rotating forward in a crash or other rapid deceleration event. If the occupant is seated behind another seat or a forward monument when this happens, the occupant's head may strike the forward structure. Although shoulder belts or other multi-point systems with shoulder harnesses can reduce forward head movement, substantial head movement may still occur. To address this, an airbag can be deployed in front of the occupant so that the occupant's head contacts the airbag as it rotates forward instead of the forward structure. Although the use of airbags can significantly reduce the likelihood of head or neck injury, it can be important to ensure that the occupant contacts the airbag in such a way that it does not put undue stress on the occupant's neck, head or other portion of the occupant's body. If an airbag is not present and the occupant is seated behind a monument, then it can also be important to ensure that the occupant contacts the monument in a similar way.

DETAILED DESCRIPTION

Figure 1A:
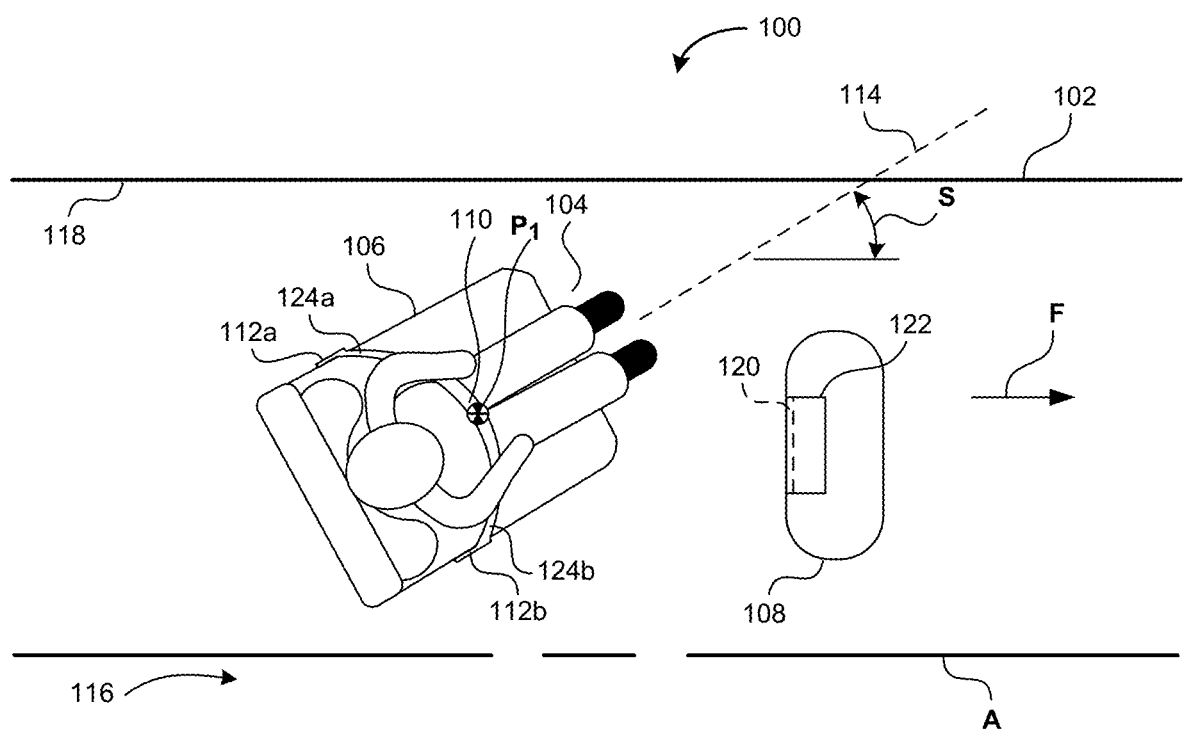
FIGS. 1A and 1B are top and side views, respectively, of an occupant secured in a vehicle seat by a standard 2-point restraint system.

The following disclosure describes various embodiments of occupant restraint systems having restraints configured to increase in length during a dynamic event to more favorably position the occupant for impact with an associated airbag or forward structure. In some embodiments, the extension of the restraint occurs in response to a load on the restraint above a preset magnitude. The load can be generated by a vehicle dynamic event, such as a crash, that causes the occupant's body to shift forward against the restraint. In some embodiments, the extension of the restraint is controlled by means of a mechanical device that is actuated by the loads imparted on the restraint by the occupant's body motion. As described in greater detail below, the extension of the restraint during the dynamic event can favorably position the occupant to, for example, reduce the speed at which the occupant's head contacts an airbag or monument by allowing the occupant's torso to move forward and contact the airbag or monument before the head does. The favorable positioning of the occupant can also reduce the angle of the occupant's neck when the head makes contact with an airbag or monument, and thereby reduce the load or stress on the neck from the impact. Accordingly, various embodiments of the extendable restraint systems described herein can mitigate the potential for neck injury or other injuries resulting from impact with an airbag or forward monument by improving the position and/or orientation of the occupant relative to the airbag or monument.

In some embodiments, the restraint systems described herein can be referred to as "dual stage" or "dual stage smart" extending restraint systems because they are configured to operate in a first stage (i.e., an unextended stage) prior to a dynamic event, and then operate in a second stage (i.e., an extended stage) in response to a load imparted during a dynamic event. Various embodiments of the restraint systems described herein can include an extension mechanism which can be, for example, a feature of the restraint hardware (e.g., the hardware which attaches a web of the restraint system to a seat or vehicle hard point) or a construction within the webbing of the restraint. The extension mechanism provides a limited and controlled amount of additional length to the restraint during a crash event to allow a more ideal positioning of the occupant for contact with an airbag, forward structure, or other object.

Certain details are set forth in the following description and in FIGS. 1A-10 to provide a thorough understanding of various embodiments of the disclosure. Other details describing well-known structures, materials, operations and/or systems often associated with restraint systems, seat belts, airbag systems, and related circuitry in aircraft and other vehicles are not shown or described in detail in the following disclosure to avoid unnecessarily obscuring the description of the various embodiments of the technology. Additionally, those of ordinary skill in the art will recognize that the present technology can be practiced without one or more of the details set forth herein, or with other structures, methods, components, and so forth. For example, several embodiments of occupant restraint systems are described below in the context of commercial passenger aircraft. However, the various systems and aspects thereof disclosed herein may be used in a wide variety of other vehicles, including without limitation other aircraft (e.g., private and military aircraft), ground vehicles (e.g., automobiles, trucks, buses and trains) watercraft, etc.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
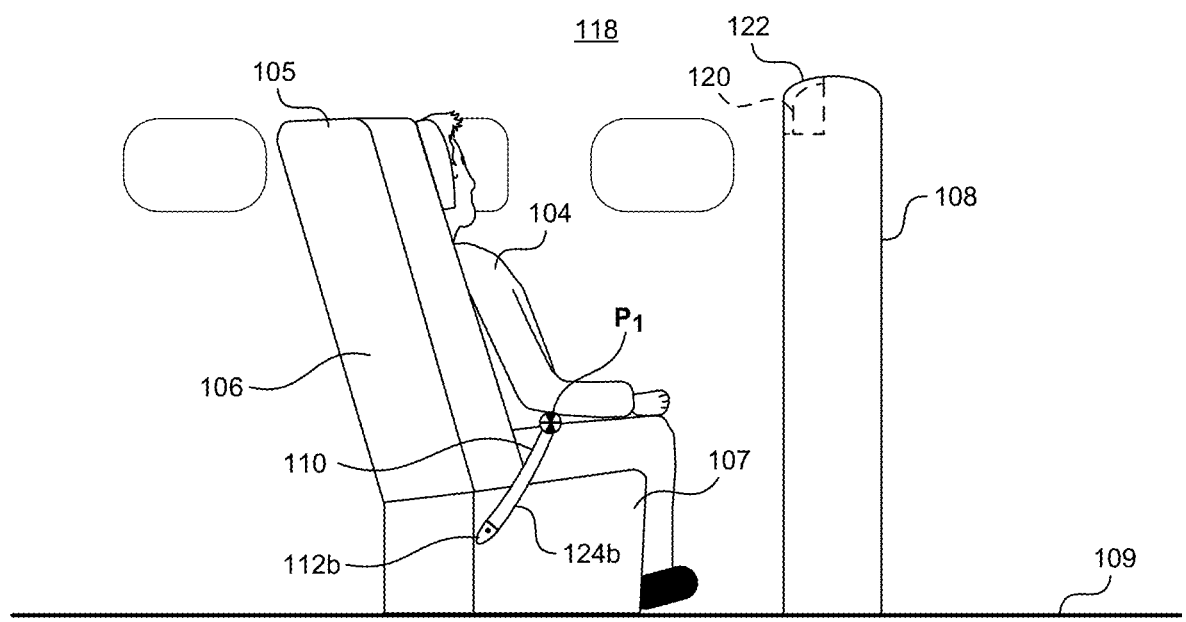

FIGS. 1A and 1B are top and side views, respectively, of an occupant 104 secured in a vehicle seat 106 by a conventional 2-point restraint 110. Referring to FIGS. 1A and 1B together, in the illustrated embodiment the seat 106 is positioned in a seating area 100 of a commercial aircraft 102 between a passenger aisle 116 (e.g., a central aisle) and a side wall 118. The aircraft 102 has a longitudinal axis A (e.g., a centerline of the aircraft fuselage) that extends parallel to a forward direction of flight indicated by arrow F. The seat 106 can include a back portion 105 extending upwardly from a base portion 107 fixedly mounted to a floor 109 of the aircraft 102. In one aspect of the illustrated embodiment, the seat 106 can be at least generally similar to conventional seats in, for example, a first or business class cabin of a commercial passenger aircraft or business jet. For example, the seat 106 can have a centerline 114 that is oriented at an angle S relative to the longitudinal axis A of the aircraft 102. In some embodiments, the angle S can range from about 5 degrees to about 40 degrees, or from about 10 to about 30 degrees. In other embodiments, the seat 106 can be positioned in other orientations and/or other settings in the aircraft 102. For example, in other embodiments the seat centerline 114 can be facing directly forward as indicated by arrow F and parallel to, or at least approximately parallel to, the longitudinal axis A. Additionally, as those of ordinary skill in the art will appreciate, although only one seat 106 is illustrated in FIGS. 1A and 1B, in other embodiments, additional seats can be positioned to one or both sides of the seat 106 to comprise a row of seats in the aircraft 102. In other embodiments, the restraint systems described herein can be used to protect occupants in other types of vehicles, including other types of aircraft (e.g., both fixed- and rotary-wing aircraft), land vehicles (e.g., automobiles), watercraft, etc.

The 2-point restraint 110 is a lap seat belt having a first web portion 124a and a corresponding second web portion 124b. A proximal end of the first web portion 124a is fixedly attached to a seat structure (e.g., a seat base, frame, etc.) on one side of the seat 106 by a first attachment fitting 112a, and the proximal end of the second web portion 124b is similarly attached to the seat structure on the opposite side of the seat 106 by a second attachment fitting 112b. The distal end of the first web portion 124a can carry a conventional web connector having a tongue portion (not shown), and the distal end of the second web portion 124b can carry a corresponding buckle assembly (also not shown) configured to receive and releasably engage the connector tongue to securely couple the two web portions 124a, 124b together around the waist of the seat occupant 104 in a conventional manner known in the art. As shown in FIGS. 1A and 1B, when the occupant 104 is positioned in the seat 106 in a normal, upright seating position and properly secured by the restraint 110, the position of the occupant's body can be represented by a first point $P_1$ which, for purposes of illustration, is generally located in the center of the occupant 104 where the restraint 110 extends across the occupant's waist.

In another aspect of this embodiment, the seating area 100 includes a structure 108 at least partially separating the seating area 100 from the seating area in front of it. In the illustrated embodiment, the structure 108 is a monument fixedly attached to the floor 109 of the seating area 100 adjacent to the aisle 116. The structure 108 is generally positioned forward of the seat 106 in the direction F, but slightly offset from the seat centerline 114. As those of ordinary skill in the art will understand, in other embodiments the seating area 100 can include other types of structures having the same or other positions relative to the seat 106 including, for example, other types of monuments (e.g., partitions, closets, bar units, seat ottomans, etc.), divider walls, galley walls, and other objects. Similarly, in other embodiments the structure 108 can be a seat back of a seat positioned directly in front of the seating area 100. In yet other embodiments, the structure 108 can be omitted.

In the illustrated embodiment, the structure 108 can include an airbag housing 122 positioned toward an upper portion thereof. As described in greater detail below, the housing 122 can provide a suitable enclosure for an airbag 120 which is folded and stowed within the housing 122 in FIGS. 1A and 1B. In other embodiments, the stowed airbag 120 can be positioned in, or carried by, other structures, such as other monuments, a seat back positioned forward of the seat 106, a structure mounted to the side wall 118, and/or otherwise positioned forward, or at least generally forward of the seat 106. As described in greater detail below, the airbag 120 can be deployed through an opening in the housing 122 and toward the seat 106 during a crash or other rapid deceleration event so that the occupant's head will strike the airbag 120 and not the structure 108, thereby reducing the likelihood of injury.

Figure 2A:
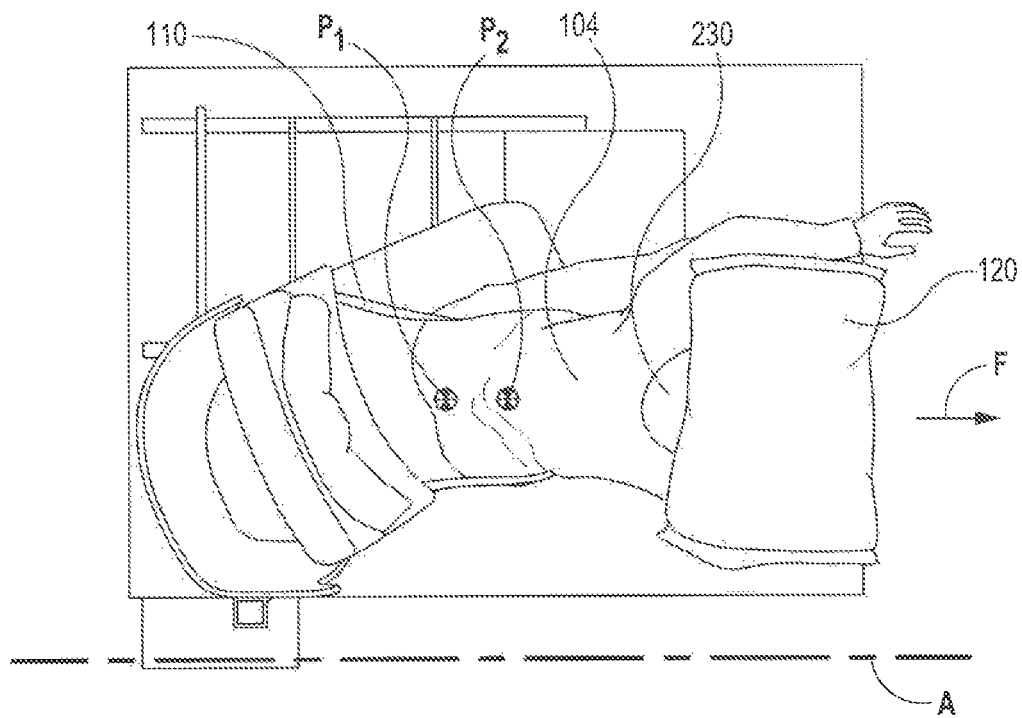
FIGS. 2A and 2B are top and side views, respectively, of the occupant of FIGS. 1A and 1B after the vehicle has experienced a rapid deceleration event.
Figure 2B:
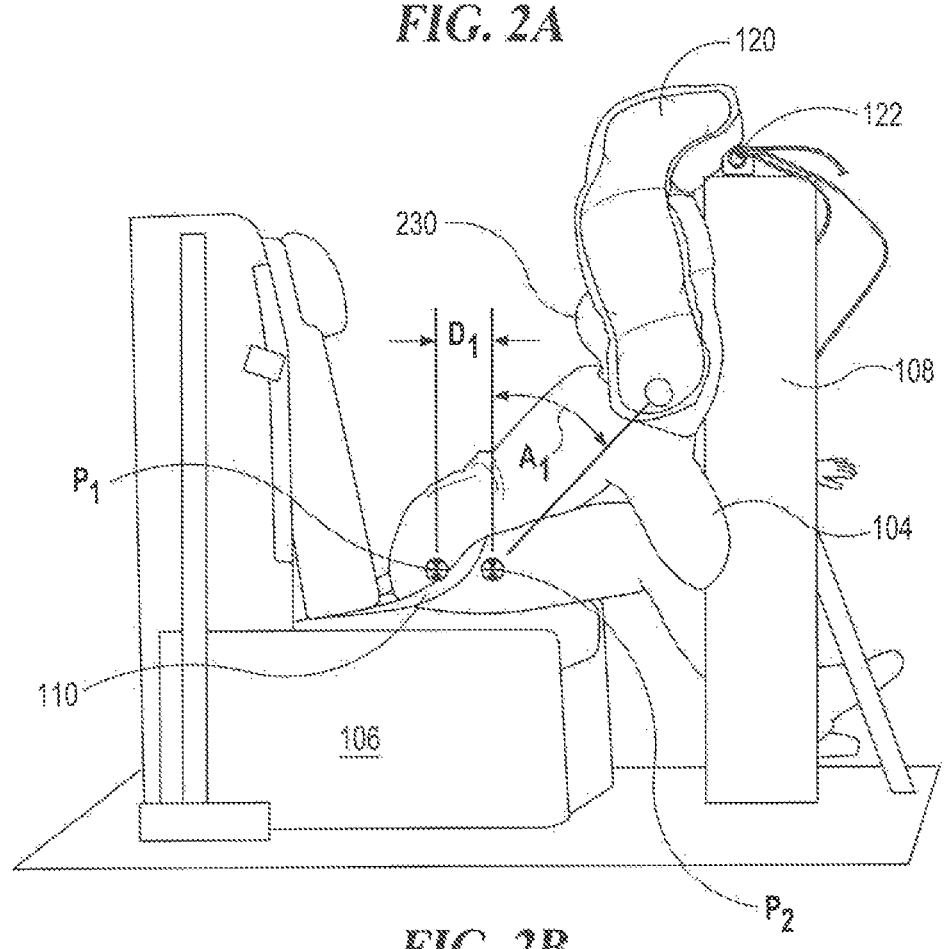

FIGS. 2A and 2B are top and side views, respectively, of the seating area 100 immediately after the aircraft 102 has experienced a dynamic event. The dynamic event can, for example, be an accident, collision, or other dynamic event that causes a rapid deceleration (or acceleration) in a direction parallel to the longitudinal axis A (e.g., a deceleration greater than about 10 g's but less than about 20 g's, such as 15 g's). As described in greater detail below, an airbag system can include a crash sensor that senses the vehicle deceleration (or acceleration) and sends a corresponding signal to an airbag deployment circuit which in turn activates an inflator, causing the inflator to discharge compressed gas into the airbag 120. The compressed gas inflates the airbag 120 and causes it to deploy from the housing 122 and into position between the occupant 104 and the monument 108 as shown in FIGS. 2A and 2B.

The airbag 120 and/or the operational systems associated therewith can be at least generally similar in structure and function to one or more of the airbags and associated systems described in U.S. patent application Ser. No. 14/505,277, filed Oct. 2, 2014, and titled ACTIVE POSITIONING AIRBAG ASSEMBLY AND ASSOCIATED SYSTEMS AND METHODS; U.S. patent application Ser. No. 13/424,197, filed Mar. 19, 2012, now U.S. Pat. No. 8,523,220, and titled STRUCTURE MOUNTED AIRBAG ASSEMBLIES AND ASSOCIATED SYSTEMS AND METHODS; U.S. patent application Ser. No. 14/384,655, filed Sep. 11, 2014, and titled STRUCTURE MOUNTED AIRBAG ASSEMBLIES AND ASSOCIATED SYSTEMS AND METHODS; U.S. Provisional Patent Application No. 62/139,684, filed Mar. 28, 2015, and titled EXTENDING PASS-THROUGH AIRBAG OCCUPANT RESTRAINT SYSTEMS, AND ASSOCIATED SYSTEMS AND METHODS; U.S. patent application Ser. No. 15/079,984, filed Mar. 24, 2016, and titled EXTENDING PASS-THROUGH AIRBAG OCCUPANT RESTRAINT SYSTEMS, AND ASSOCIATED SYSTEMS AND METHODS; U.S. Provisional Patent Application No. 62/146,268, filed Apr. 11, 2015, and titled ACTIVE AIRBAG VENT SYSTEM; U.S. patent application Ser. No. 15/096,158, filed Apr. 11, 2016, and titled ACTIVE AIRBAG VENT SYSTEM; U.S. patent application Ser. No. 15/398,977 filed Jan. 5, 2017, and titled MULTI-CHAMBER AIRBAGS AND ASSOCIATED METHODS OF MANUFACTURE AND USE; each of patents and patent applications listed above or identified elsewhere herein is incorporated herein by reference in its entirety.

As shown in FIGS. 2A and 2B, when the vehicle experiences a crash or other significant dynamic event that results in a rapid deceleration, the occupant's upper torso instantly rotates forward about the restraint 110 in the direction F. Additionally, the rapid declaration also causes the occupant's body to instantly shift (e.g., slide) forward in the seat 106 a distance $D_1$ from the first point $P_1$ to the second point $P_2$. As best seen in FIG. 2B, this relatively small amount of forward motion of the occupant's waist causes the occupant's upper torso to contact the airbag 120 at a relatively steep angle $A_1$. In some embodiments, the angle $A_1$ can be from about 35 degrees to about 60 degrees, or from about 40 degrees to about 50 degrees relative to the vertical direction. This positioning can cause the occupant's head 230 to contact the airbag 120 before, or at least substantially before, the occupant's upper torso or shoulder area contacts the airbag. In some instances, the occupant's upper torso may not contact the airbag 120 at all. Impacting the airbag 120 in this way can cause the occupant's head 230 to be placed at a relatively sharp angle relative to the occupant's upper torso, which can put undue stress on the occupant's neck.

Figure 3A:
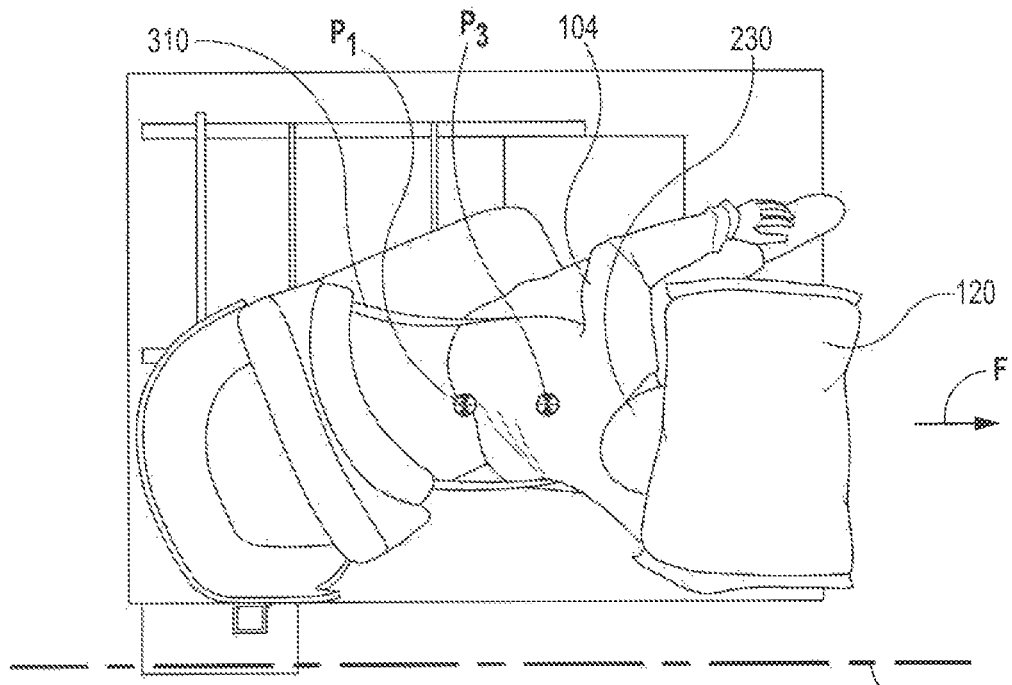
FIGS. 3A and 3B are top and side views, respectively, of an occupant secured in a vehicle seat by an extendable 2-point restraint system configured in accordance with an embodiment of the present technology.
Figure 3B:
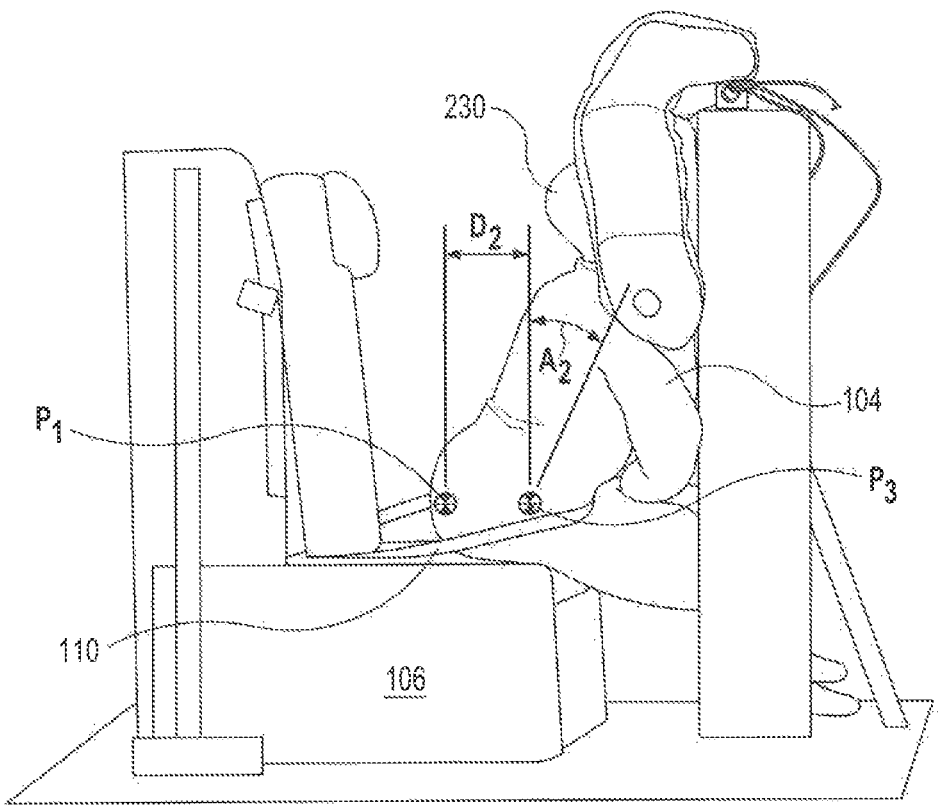

FIGS. 3A and 3B are top and side views, respectively, of the occupant 104 secured to the seat 106 during a dynamic event by an extending restraint 310 configured in accordance with an embodiment of the present technology. In FIGS. 3A and 3B, the occupant 104 is depicted in substantially the same dynamic circumstances as the occupant 104 is depicted in FIGS. 2A and 2B. More specifically, in both scenarios the aircraft 102 was moving forward in direction F and experienced an equivalent, or an at least approximately equivalent, dynamic event (e.g., a crash) resulting in a rapid deceleration acting parallel to the longitudinal axis A (and opposite to the direction F). In the embodiment of FIGS. 3A and 3B, however, the restraint 310 is a 2-point extendable restraint that, as described in greater detail below, is configured to extend a preset amount when subjected to a predetermined tension load (e.g., a tension load caused by the inertia of the occupant's moving body). Thus, the extension of the restraint 310 only occurs during a dynamic event of sufficient magnitude, thereby allowing the occupant's body to move forward in the seat 106 more than the body would otherwise move with a conventional 2-point restraint, such as the restraint 110 described above with reference to FIGS. 1A-2B.

By way of example, the extendable restraint 310 enables the occupant's waist to move forward in the direction F a distance $D_2$ from the first point $P_1$ to a third point $P_3$. As can be seen by a comparison of the distance $D_2$ in FIG. 3B to the distance $D_1$ in FIG. 2B, the extendable restraint 310 enables the occupant 104 to move forward a greater distance than the conventional restraint 110, thereby positioning the occupant 104 closer to the structure 108. As further illustrated in FIG. 3B, this positioning allows the occupant's upper torso to contact the airbag 120 at a relatively shallow angle $A_2$. In some embodiments, the angle $A_2$ can be from about 5 degrees to about 50 degrees, or from about 10 degrees to about 35 degrees relative to the vertical direction. This positioning also allows the occupant's upper torso and/or shoulder area to contact the airbag 120, in addition to the occupant's head 230. By distributing the airbag impact load over the occupant's torso and head, the portion of the impact load on the occupant's head 230 is reduced. Additionally, by reducing the angle of the occupant's torso from the angle $A_1$ in FIG. 2B to the angle $A_2$ in FIG. 3B, the angle of the occupant's neck is reduced at impact with the airbag 120, thereby further reducing the impact load on the occupant's neck and the potential for injury. Accordingly, extendable restraint systems configured in accordance with the present technology, when used in combination with an airbag, such as the airbag 120, can reduce the angle of the occupant's torso relative to the airbag at impact, and can enable the occupant's upper torso to contact the airbag 120 along with the occupant's head 230. In some embodiments, these features can advantageously reduce the head strike angle and the head strike speed when the occupant's head strikes the airbag, thereby reducing the load and stress on the occupant's head and neck (and hence the likelihood of injury) from a dynamic event.

The favorable occupant positioning features provided by the extendable restraints described herein are not limited to use with airbag systems, but can also improve positioning of the occupant's torso when impacting a fixed monument, a seat back, and/or other structural strike hazard positioned in front of or otherwise in the path of the restrained occupant in the absence of an airbag. In addition to controlling the position of the occupant 104 during a crash or other significant dynamic event, in some embodiments the restraint 310 can also be configured to absorb a substantial amount of the kinetic energy from the forward motion of the occupant's body. Absorbing the energy from the rapid deceleration of the occupant's body can also reduce the speed at which the occupant's upper torso and/or head 230 impacts the airbag 120, thereby further reducing the potential for injury.

Figure 4B:
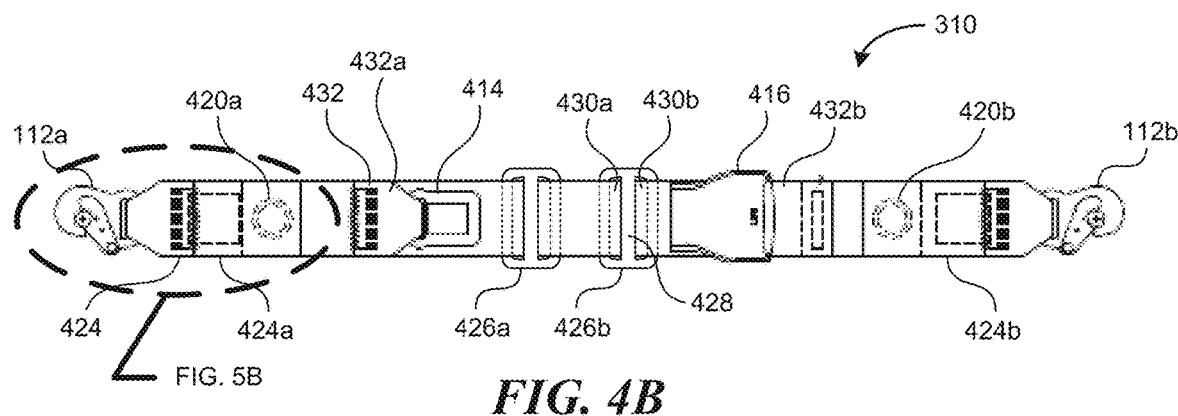
FIGS. 4A and 4B are side and top views, respectively, of an extendable restraint system configured in accordance with an embodiment of the present technology.
Figure 4A:
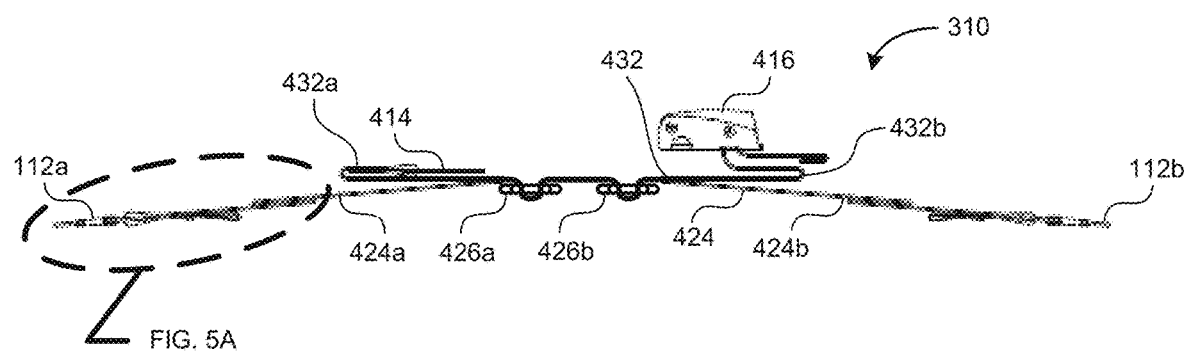

The restraint 310 can include various types of mechanisms and/or other features to control the amount of restraint extension that occurs in response to a dynamic event greater than a certain magnitude. FIGS. 4A and 4B, for example, are side and top views, respectively, of the restraint 310 illustrating a first extension feature 420*a* and a second extension feature 420*b* configured in accordance with an embodiment of the present technology. Referring to FIGS. 4A and 4B together, the restraint 310 of the illustrated embodiment includes a first web 424 and a second web 432. A first attachment fitting 112*a* is attached (via, e.g., a loop of webbing) to a first end portion 424*a* of the first web 424, and a second attachment fitting 112*b* is similarly attached to a second end portion 424*b* of the first web 424. The attachment fittings 112*a, b* can be conventional hook-type fittings known in the art for securing seat belt webs to anchor points (e.g., a bolt, bar, hook, etc.) on seat frames or other adjacent structures. A web connector having a tongue portion 414 is fixedly attached to a first end portion 432*a* of the second web 432, and a corresponding buckle assembly 416 (e.g., a conventional seat belt buckle known in the art) is attached to a second end portion 432*b* of the second web 432. The buckle assembly 416 can be a conventional seat belt buckle configured to releasably engage the web connector tongue portion 414 in conventional manner well known in the art. In some embodiments, the buckle assembly 416 can be coupled to the second end portion 432*b* by routing the second end through a passage in the buckle assembly 416 that enables the seat occupant to manually adjust the length of the second web 432 as needed to securely fasten the second web 432 about the occupant's waist in a conventional manner. By way of example, the webs 424 and 432 can be at least generally similar in structure and function to conventional seat belt webs formed from, for example, woven nylon webbing. In other embodiments, the webs 424 and 432 can be formed from other materials of suitable strength and flexibility.

In the illustrated embodiment, the restraint 310 further includes a first web clip 426*a* and a second web clip 426*b*. The web clips 426*a, b* are essentially identical, and each includes a bar 428 extending across a center portion thereof to define a first passage 430*a* to one side of the bar 428 and a second passage 430*b* to the other side of the bar 428. In the illustrated embodiment, both the first web 424 and the second web 432 are routed through the first and second passages 430*a, b* and around the bar 428 of each web clip 426*a, b* to position the web clips 426*a, b* on the first web 424 and the second web 432 as shown in FIGS. 4A and 4B. As described in greater detail below with reference to FIGS. 8A and 8B, the purpose of the web clips 426*a, b* is to securely attach the second web 432 (which will extend around the occupant's waist) to the first web 424 (which will be securely attached to the seat base or other mounting structure). When the first web 432 is properly secured around the waist of a seat occupant, the web clips 426*a, b* will positioned against, or at least adjacent to, the occupant's lower back. To avoid the occupant discomfort that could result from using single clip located in a center portion of the occupant's back, the restraint 310 of the illustrated embodiment includes two of the web clips 426*a, b* which are spaced apart from each other. In other embodiments, the web clips 426*a, b* can be padded, or they can located within the seat back 105 behind the seat cover and/or padding. In further embodiments, a single web clip can be used. In yet other embodiments, the second web 432 can be attached to the first web 424 by other suitable means, such as by stitching, fasteners, adhesive, etc.

Figure 5A:
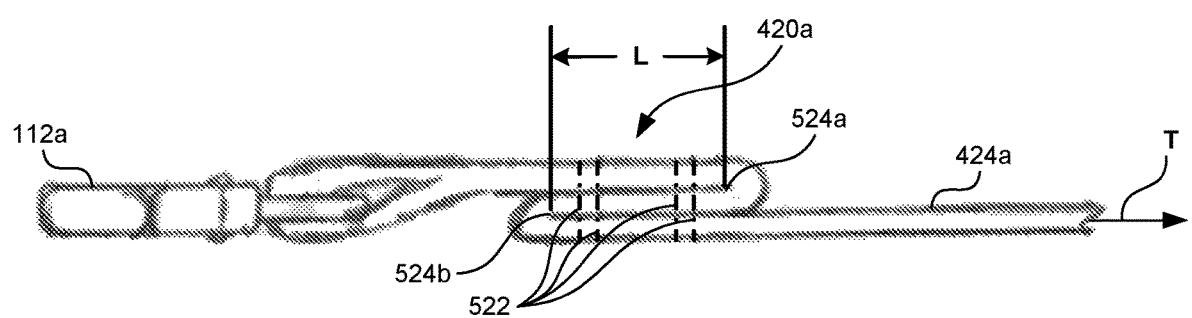
FIGS. 5A and 5B are side and top views, respectively, of a portion of the extendable restraint system of FIGS. 4A and 4B prior to restraint extension, in accordance with an embodiment of the present technology.
Figure 5B:
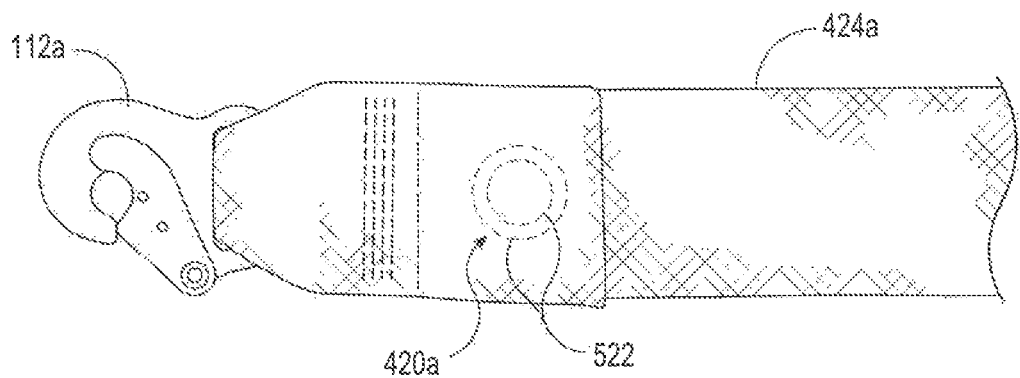

FIGS. 5A and 5B are enlarged side and top views, respectively, of a portion of the first web portion 424*a* for the purpose of illustrating the structure and function of the first extension feature 420*a*. Although not shown in FIGS. 5A and 5B, the second web extension feature 420*b* can be at least generally similar in structure and function to the first web extension feature 420*a*. Referring to FIGS. 5A and 5B together, to form the first web extension feature 420*a*, the first web portion 424*a* is first doubled over on itself in a "Z-fold" about a first fold line 524*a* and a second fold line 524*b* as shown in FIG. 5A. The fold lines 524*a, b* can be spaced apart by a distance L. In some embodiments, the distance L can range from about 1 inch to about 2.5 inches, or from about 1.5 inches to about 2 inches. The folded-over web is then fastened together. For example, in the illustrated embodiment the folded-over web portion is fastened together by stitching 522. The stitching can include thread, such as nylon thread. As described in greater detail below, the tensile strength of the thread used in the stitching 522 and/or the number of stitches and/or the type of stitch pattern can be selected so that the stitching 522 will rupture and release the folded-over web portion when a preset tension load T is applied to the first web portion 424*a*. The tension force T can be selected to correspond to an inertial force that would be imparted to the first web portion 424*a* when the occupant experiences a vehicle dynamic event (e.g., a rapid deceleration) above a preset magnitude or threshold which in turn causes the occupant's body to be thrown forward against the restraint 310 as shown in FIGS. 3A and 3B. For example, the stitching 522 can be selected and designed to rupture and permit unfolding of the web when the tension force T is from about 200 pounds to about 600 pounds, or about 400 pounds. Selecting a tension force T in this range would prevent the stitching 522 from rupturing under any type of normal usage, but would also easily rupture during a selected dynamic event, such as a deceleration of 15 g's or more. In one aspect of this embodiment, the extension feature 420*a* can also absorb some of the kinetic energy from the occupant's rapid movement during the dynamic event, and thereby further reduce the impact load on the occupant when the occupant's upper torso and/or head contact the airbag 120 or directly contact a forward monument. When it is desirable for the extension feature to additionally act as an energy absorber, the stitching 522 can be configured to rupture at a higher load than described above, such as a load ranging from about 400 pounds to about 800 pounds, or about 600 pounds.

Figure 6A:
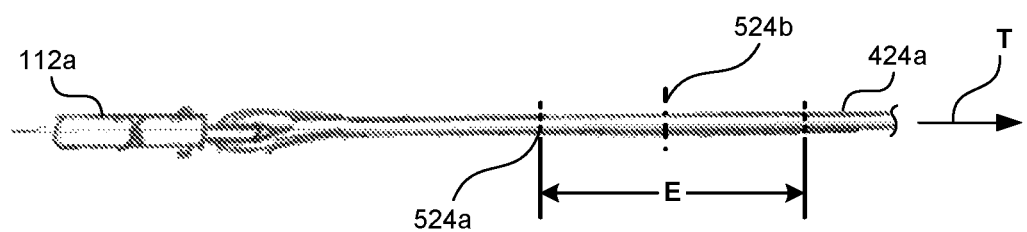
FIGS. 6A and 6B are side and top views, respectively, of the portion of the extendable restraint system of FIGS. 5A and 5B after restraint extension, in accordance with an embodiment of the present technology.
Figure 6B:
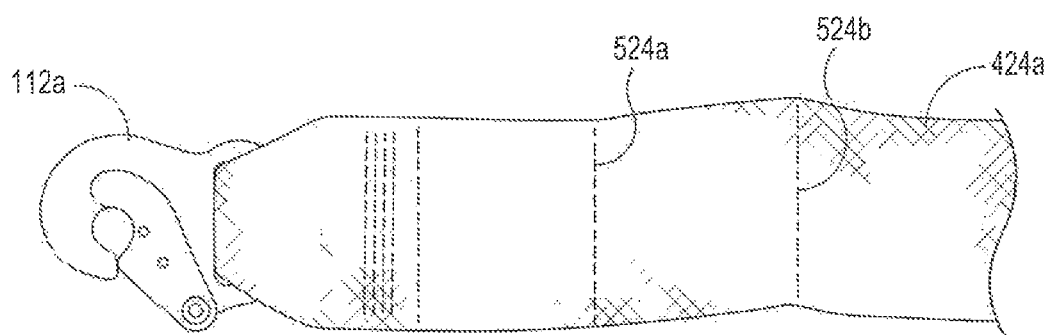

FIGS. 6A and 6B are side and top views, respectively, of the first web portion 424a after the first web portion 424a has sustained a tension load T of sufficient force to rupture the extension feature 420a (e.g., a tension force of about 400 pounds). When the extension feature 420a ruptures or otherwise releases the folded web portions, the first web portion 424a is pulled straight, increasing in length by two times the distance L, which is represented by an extension distance E. If the fold distance L shown in FIG. 5A is selected to be from about 1 inch to about 2.5 inches, then the web extension distance E will be from about 2 inches to about 5 inches once the first web portion 424a is fully extended. In those embodiments in which the second web portion 424b includes a web extension feature (e.g., the second web extension feature 420b) that is structurally equivalent or at least generally similar to the first web extension feature 420a, then the entire restraint 310 will undergo a total extension of from about 4 inches to about 10 inches in response to the dynamic event. In some embodiments, an overall increase in length of the restraint 310 of from about 4 inches to about 10 inches will correspond to a forward movement of the occupant's waist of from about 2 inches to about 5 inches, or about 4 inches. Accordingly, with reference to FIGS. 2A-3B described above, use of the extendable restraint 310 instead of the conventional restraint 110 allows the occupant 104 to move in the forward direction F about 2 to 5 inches further than the occupant 104 would otherwise move if secured in the seat 106 by the conventional restraint 110. In other embodiments, restraints configured in accordance with the present technology can include one or more extension features that provide other extension distances E to provide more or less forward movement of the occupant in response to dynamic events. (It should be noted that, although the restraint 110 (FIGS. 1A and 1B) is not an "extendable" restraint in the sense that it does not include an extension mechanism, such as the Z-fold described above, the restraint 110 still allows the occupant 104 to move forward in the direction F the relatively small distance $D_1$ due to stretching of the web portions 124a, b under load and/or compression of the occupant's waist from the tension in the restraint 110.)

Figure 7A:
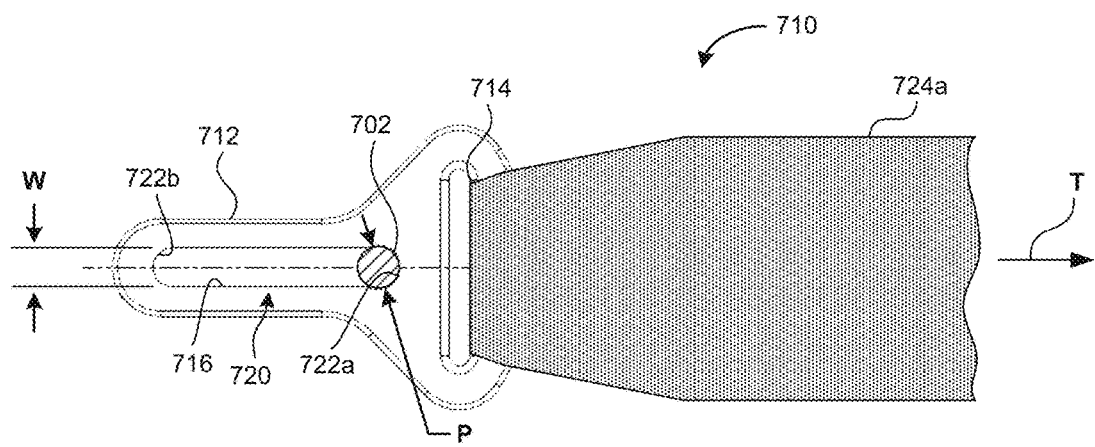
FIG. 7A is a top view of a portion of an extendable restraint system configured in accordance with another embodiment of the present technology, prior to restraint extension.
Figure 7B:
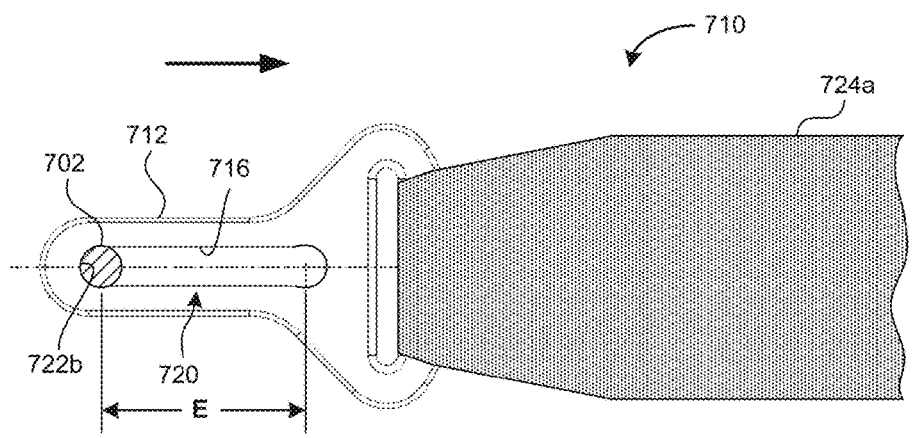
FIG. 7B is a top view of the portion of FIG. 7A after restraint extension.

The extension feature 420a described above with reference to FIGS. 4A-6B is but one type of extension mechanism that can be incorporated into the restraint 310 to provide the desired extension under load. In other embodiments, other types of extension features and mechanisms can be used. For example, FIGS. 7A and 7B are enlarged top views of a portion of a 2-point restraint 710 that includes a web attachment fitting 712 having an extension feature 720 configured in accordance with another embodiment of the present technology. In the illustrated embodiment, the restraint 710 can include a first web portion 724a securely attached to the attachment fitting 712 in a conventional manner (e.g., by looping the web 718 through an aperture in the attachment fitting 712 and then stitching the web onto itself). Although not shown, the restraint 710 can also include a second web portion attached to another of the attachment fittings 712 in a similar manner.

In the illustrated embodiment, the extension feature 720 includes an elongate channel or slot 716 that extends through the attachment fitting 712 and is oriented in general alignment with the web portion 724a. The slot 716 has a width W and a first end portion 722a spaced apart from a second end portion 722b by an extension length E. In one aspect of this embodiment, the first end portion 722a can be partially circular and have a diameter that is slightly larger than the slot width W to accommodate a bolt 702, which has a diameter P that is also slightly larger than the slot width W but just slightly smaller than, or equal to, the diameter of the first end portion 722a. This enables the attachment fitting 712 to pivot about the bolt 702 as needed for alignment of the end portion 718 in normal use. Additionally, because the bolt 702 is larger in diameter than the slot width W, under normal operating conditions the attachment fitting 712 can rotate about the bolt 702 but it cannot translate relative to the bolt 702.

In the normal operating mode and prior to extension, the bolt 702 extends through the first end portion 722a and fixedly attaches the proximal end of the web portion 724a to an anchor point on a seat structure (or nearby vehicle structure; not shown). However, when the web portion 724a experiences a tension load above a predetermined magnitude (e.g., above 400 pounds) resulting from a sudden forward acceleration of the seat occupant's body during a dynamic event, the tension load causes the bolt 702 to bear against the sidewalls of the slot 716 and deform them slightly outward. This slight increase in slot width enables the bolt 702 to move through the slot 716 as the attachment fitting 712 translates in the direction of the tension force T, until the bolt 702 is positioned against the second end portion 722b of the slot 716 as shown in FIG. 7B. In the foregoing manner, the slot width W relative to the diameter P of the bolt 702 can be sized to control the tension force T required to move the attachment fitting 712 relative to the bolt 702, and the length of the slot 716 can be selected to control the amount of extension E of the restraint 710 in response to the dynamic event. For example, in those embodiments in which the opposite end of the restraint 710 is attached to the seat (or other structure) with another of the attachment fitting 712, the distance E can be selected to range from about 2 inches to about 5 inches, resulting in an overall increase in length of the restraint 710 of from about 4 inches to about 10 inches, which in turn allows the seat occupant to move forward in the direction F (FIG. 3A) a distance of from about 2 inches to about 5 inches during the dynamic event.

Figure 8A:
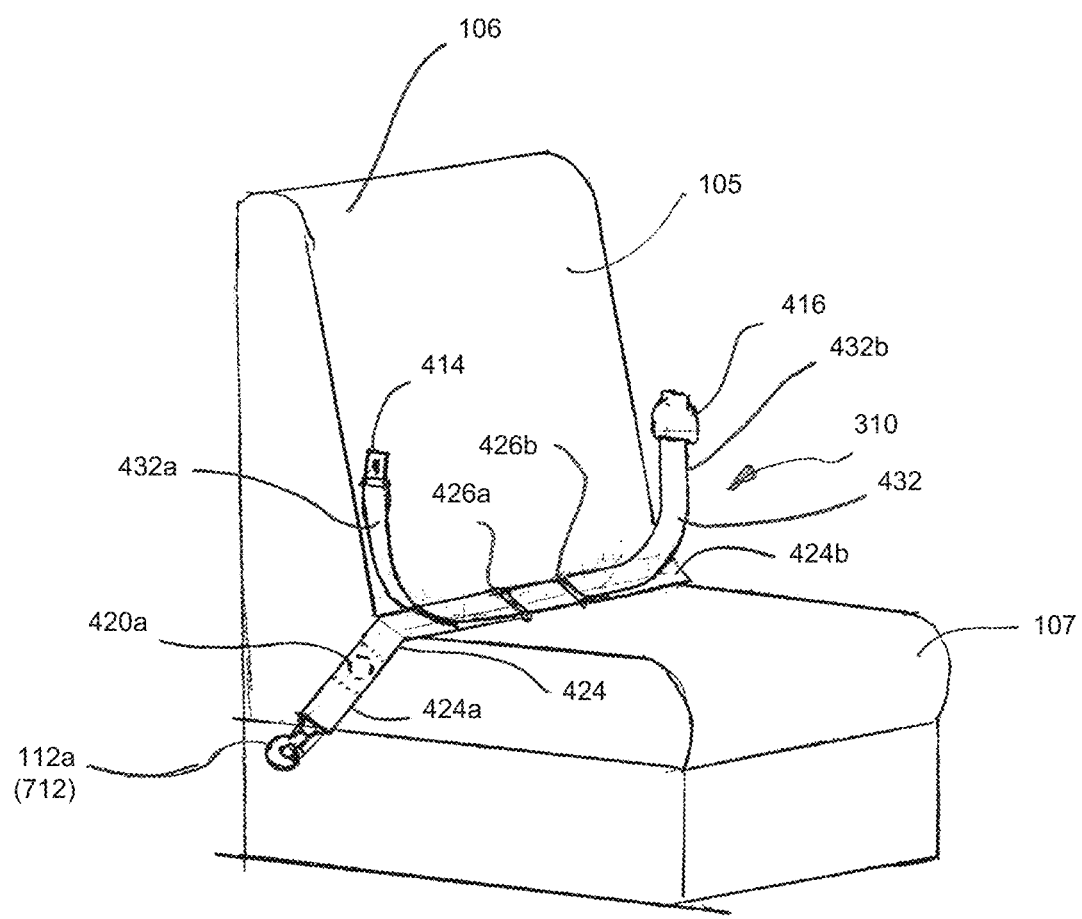
FIG. 8A is an isometric view of the extendable restraint system of FIGS. 4A-6B installed on a vehicle seat.
Figure 8B:
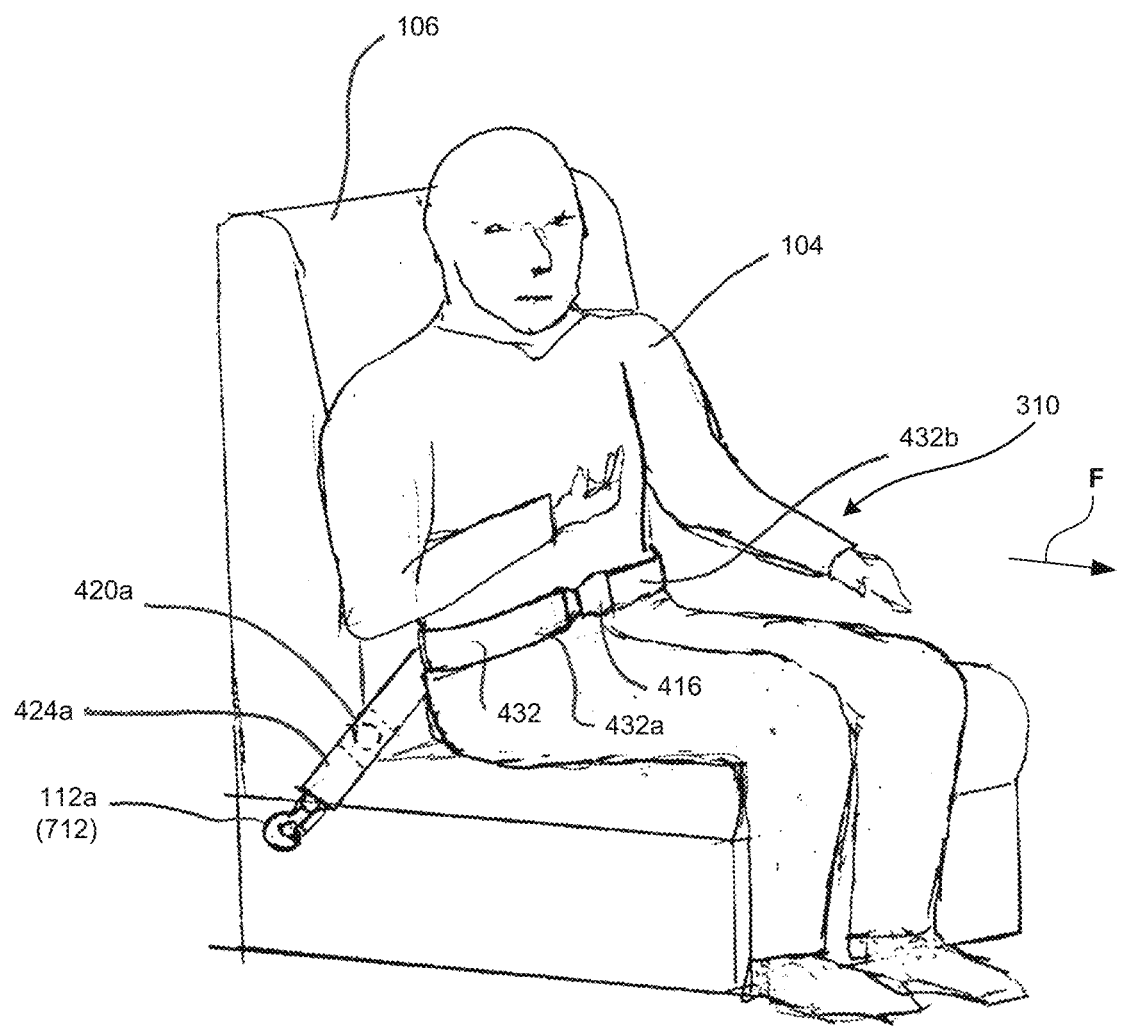
FIG. 8B is an isometric view of the extendable restraint system securely fastened around the waist of a seat occupant in accordance with the present technology.

FIG. 8A is an isometric view of the extendable restraint 310 installed on the vehicle seat 106, and FIG. 8B is an isometric view of the extendable restraint 310 with the second web 432 securely fastened around the waist of the occupant 104 in accordance an embodiment of the present technology. Referring to FIGS. 8A and 8B together, the restraint 310 is attached to the seat 106 by securely attaching the respective attachment fittings 112a, b on the first web 424 to corresponding anchor points on the seat frame or other fixed structure on opposite sides of the seat 106. The length of the first web 424 is sized so that it extends tightly across the seat 106 proximate the junction between the seat back 105 and the seat base 107 without any appreciable slack.

In some embodiments, the second web 432 can be secured around the waist of the occupant 104 in a conventional manner. More specifically, after the occupant 104 has sat down in the seat 106, the occupant 104 can grasp the connector tongue 414 in one hand and the buckle assembly 416 in the other hand, and then insert the tongue 414 into the buckle assembly 416 to couple the two parts together in a conventional manner. After the tongue portion 414 has been engaged with the buckle assembly 416, the occupant 104 can pull on the loose end of the second end portion 432*b* as required to adjust the tension in the second web 432 so that it fits snuggly around the occupant's waist. The restraint can be released by lifting a handle on the buckle assembly 416 in a conventional manner.

If the aircraft experiences a collision or other rapid deceleration greater than a preset magnitude (e.g., greater than 15 g's), the tension force in the first web 424 caused by the forward momentum of the occupant's body in the direction F releases the first and second extension features 420*a, b* to thereby extend the first web 424 as described above with reference to FIGS. 5A-6B. This enables the occupant 104 to shift slightly forward in the seat 106 to better position the occupant 104 for impact with an associated airbag or a forward structure, as described above with reference to FIGS. 3A and 3B. Although the dynamic event causes the first web 424 to extend, the second web 432 is a "non-extending web" that remains relatively tight or snug around the occupant because the second web 432 of this embodiment does not include any extension features. In some embodiments, keeping the second web 432 relatively tight while allowing the first web 424 to extend can provide better control of the occupant's body after the occupant 104 impacts the airbag or a forward structure.

In other embodiments, the extendable attachment fitting 712 described above with reference to FIGS. 7A and 7B can be used to provide extension of the restraint 310 during a dynamic event. For example, in one such embodiment the attachment fittings 112*a, b* can be replaced by two of the attachment fitting 712 and the extension features 420*a, b* in the first web 424 can be omitted. In other embodiments, more extension of the restraint may be required to reduce or prevent injury. In such embodiments, the attachment fittings 712 can be used in addition to the extension features 420*a, b* (and/or other extension mechanisms) to provide a controlled amount of web extension during a dynamic event.

In some embodiments, less forward movement of the occupant than is provided by an extension mechanism (such as the extension features 420 or the attachment fittings 712) may be sufficient to prevent or reduce injury from impacting an airbag or strike hazard (e.g., a monument) in an unfavorable orientation. In such embodiments, the restraint 310 shown in FIGS. 4A and 4B without any extension mechanisms (e.g., 420*a* and 420*b*, or 712) can be used as shown in FIGS. 8A and 8B to provide enough forward movement of the occupant 104 to prevent or reduce injury. In this case, the configuration of the restraint 310 allows the kinetic movement of the occupant during impact to stretch the web portions of the restraint 310 and allow sufficient forward movement to prevent or reduce injury.

Figure 9A:
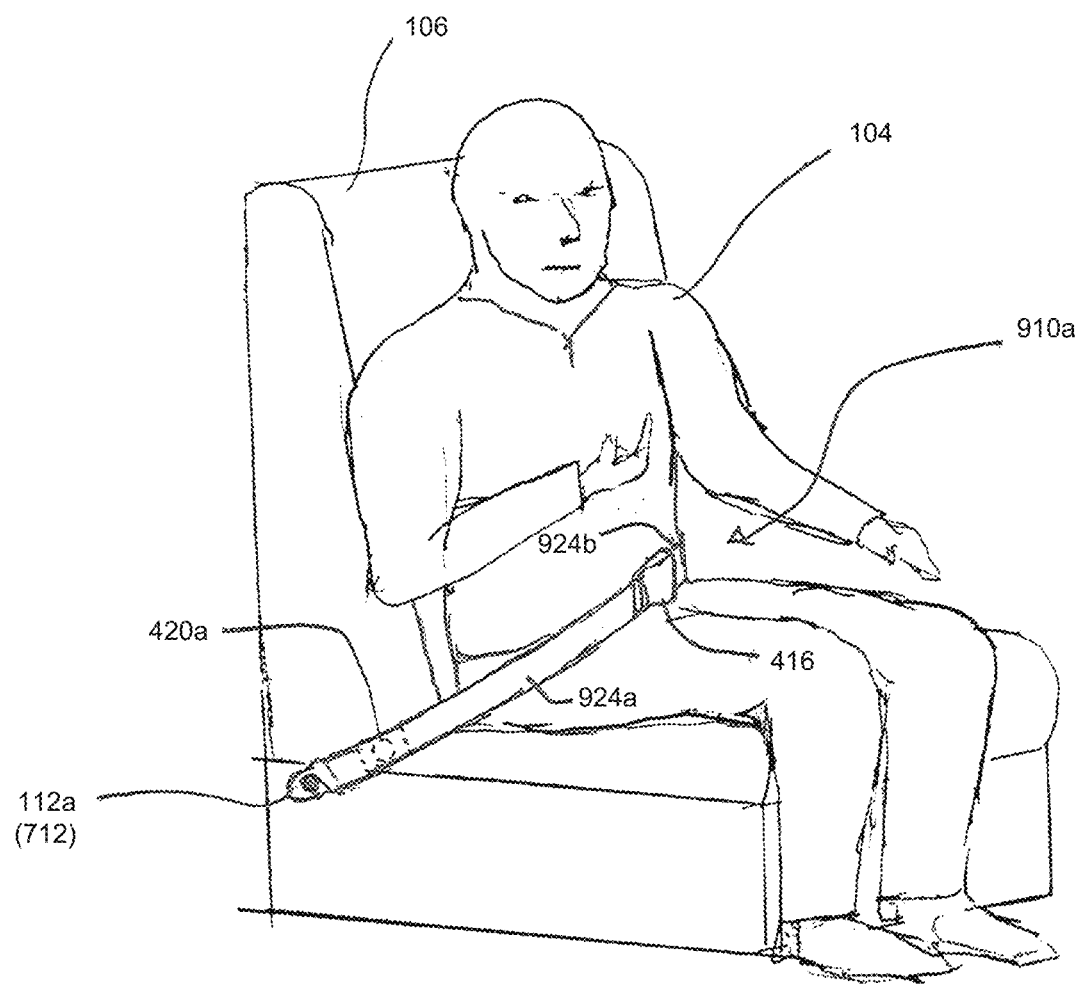
FIG. 9A is an isometric view of an extendable restraint system configured in accordance with another embodiment of the present technology and securely fastened around the waist of a seat occupant.

FIG. 9A is an isometric view of the occupant 104 secured in the seat 106 by an extendable restraint 910*a* configured in accordance with another embodiment of the present technology. In the illustrated embodiment, the restraint 910*a* is a 2-point restraint (e.g., a lap seat belt) having a first web 924*a* and a second web 924*b*. In one aspect of this embodiment, each of the first and second webs 924*a, b* can include a corresponding web extension feature 420*a, b* as described in detail above with reference to FIGS. 4A-6B (the second extension feature 420*b* is not visible in FIG. 9A). The proximal end of the first web 924*a* is attached to the seat frame by a first attachment fitting 112*a*, and the proximal end the second web 924*b* can be similarly attached to the seat frame on the opposite side of the occupant 104. The distal end of the first web 924*b* can carry a web connector having a tongue portion (not shown), and the distal end of the second web 924*b* can carry a corresponding buckle assembly 416. The tongue portion of the web connector can be releasably engaged with the buckle assembly 416 to secure the restraint 910*a* around the occupant's waist in a conventional manner as shown in FIG. 9A.

If the aircraft experiences a collision or other rapid deceleration greater than a preset magnitude (e.g., greater than 15 g's), the tension force in the first and second webs 924*a, b* caused by the forward momentum of the occupant's body causes the first and second extension features 420*a, b* to rupture, thereby enabling the restraint 910*a* to extend as described above with reference to FIGS. 5A-6B. This enables the occupant 104 to shift slightly forward in the seat 106 to better position the occupant 104 for impact with an associated airbag or a forward structure, as described above with reference to FIGS. 3A and 3B. In other embodiments, the extendable attachment fitting 712 described above with reference to FIGS. 7A and 7B can be used to provide extension of the restraint 910*a* during a dynamic event. For example, in one such embodiment the attachment fittings 112*a, b* can be replaced by two of the attachment fittings 712 and the extension features 420*a, b* in the first and second webs 924*a, b* can be omitted. In other embodiments, the attachment fittings 712 can be used in addition to the extension features 420*a, b* to provide a preset amount of web extension during a dynamic event.

Figure 9B:
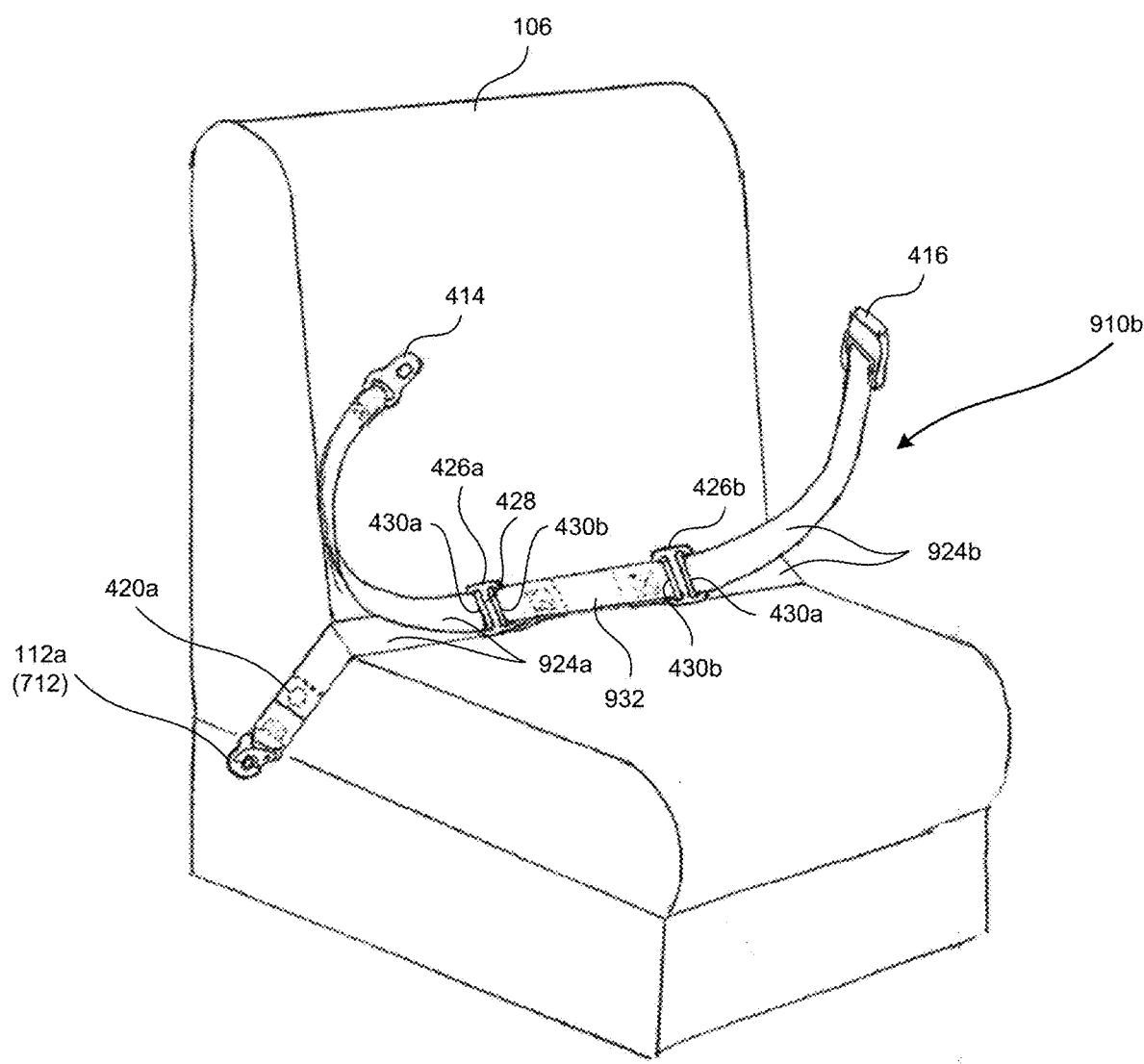
FIG. 9B is an isometric view of an extendable restraint system configured in accordance with a further embodiment of the present technology.

FIG. 9B is an isometric view of an extendable restraint 910*b* configured in accordance with a further embodiment of the present technology and installed on the vehicle seat 106. In this embodiment, the restraint 910*b* includes a first web 924*a* and a second web 924*b*, which are at least generally similar to the first web 924*a* and the second web 924*b*, respectively, described above with reference to FIG. 9A. For example, the proximal end of the first web 924*a* can be attached to the seat frame by a first attachment fitting 112*a*, and the proximal end of the second web 924*b* can be attached to the seat frame on the opposite side of the seat 106 by a second attachment fitting 112*b* (not shown). The distal end of the first web 924*a* carries a web connector having a tongue portion 414, and the distal end of the second web 924*b* carries a corresponding buckle assembly 416. In a further aspect of the illustrated embodiment, each of the first and second webs 924*a, b* can include a corresponding web extension feature 420*a, b* as described in detail above with reference to FIGS. 4A-6B. In other embodiments the extendable attachment fitting 712 described above with reference to FIGS. 7A and 7B can be used to provide a preset amount of extension of the restraint 910*b* during a dynamic event.

In one aspect of the illustrated embodiment, the restraint 910*b* further includes a first web clip 426*a* and a second web clip 426*b* which are securely coupled to opposite ends of a third web 932. The web clips 426*a, b* are at least substantially identical to the web clips 426*a, b* described above with reference to FIGS. 4B and 4A and each includes a first passage 430*a* separated from a second passage 430*b* by a central bar 428. Each end portion of the third web 932 is looped through the second passage 430*b* in the corresponding web clip 426*a, b* and sewn or otherwise attached to itself to securely attach one end of the third web 932 to the first web clip 426*a* and the other end of the third web 932 to the second web clip 426*b*. In this manner, the third web 932 flexibly secures the two web clips 426*a, b* together at a fixed distance apart (e.g., between about 2 inches and about 15 inches apart, between about 6 inches and about 12 inches apart, or about 8 inches apart). In addition, the first web 924*a* slidably extends through the first passage 430*a* in the first web clip 426*a*, and the second web 924*b* slidably extends through the first passage 430*a* in the second web clip 426*b*, to slidably attach each of the first and second webs 924a and 924b to opposite ends of the third web 932.

Figure 9C:
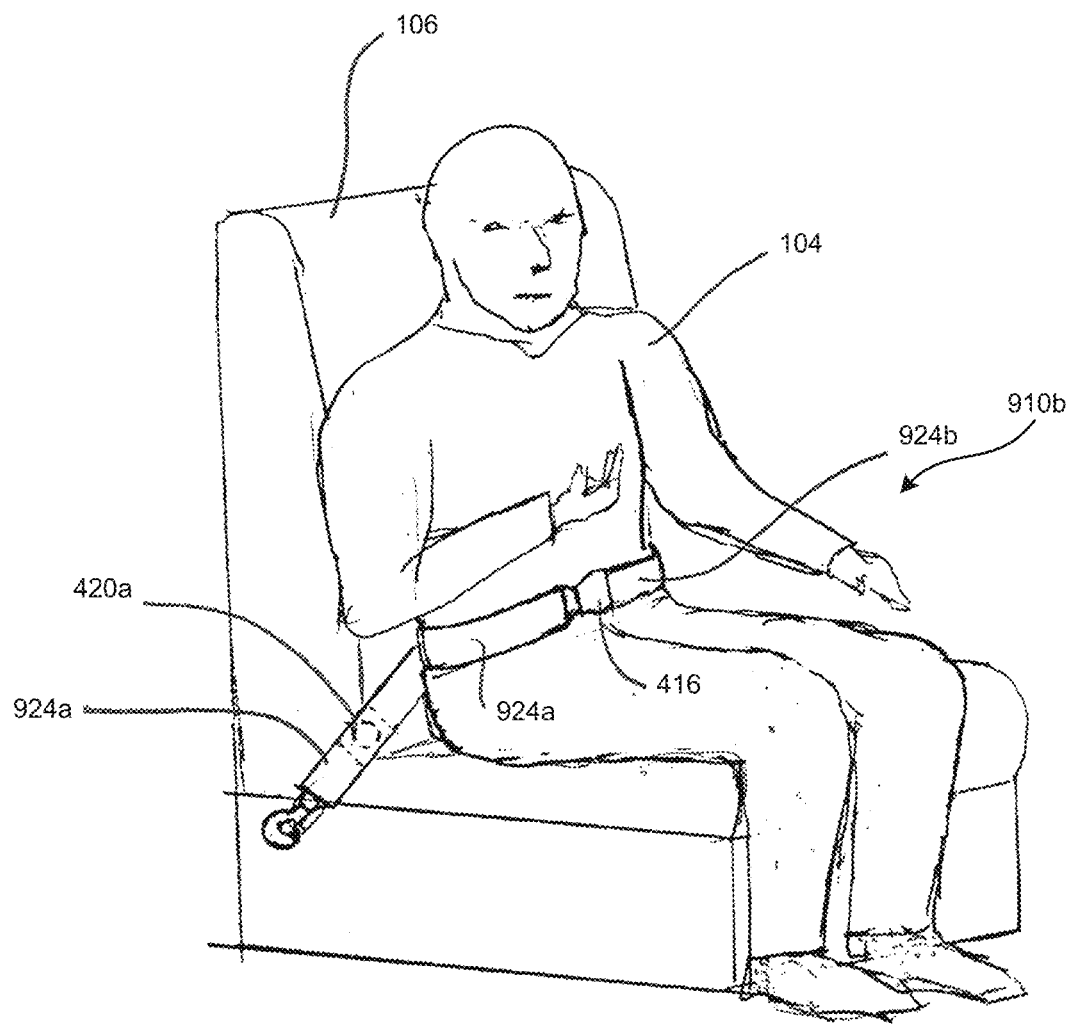
FIG. 9C is an isometric view of the extendable restraint system of FIG. 9B securely fastened around the waist of a seat occupant.

FIG. 9C is an isometric view of the extendable restraint 910b after the tongue portion 414 (FIG. 9B) has been releasably engaged with the buckle assembly 416 to secure the first web 924a and the second web 924b around the waist of the occupant 104 in accordance with an embodiment of the present technology. In this embodiment, the restraint 910b is secured around the waist of the occupant 104 in a manner that is at least generally similar to that described above with reference to FIG. 8B. If the aircraft experiences a collision or other rapid deceleration greater than a preset magnitude, the tension force in the first and second webs 924a, b caused by the forward momentum of the occupant's body causes the first and second extension features 420a, b to rupture, thereby enabling the restraint 910b to extend as described above with reference to FIGS. 5A-6B. This enables the occupant 104 to shift slightly forward in the seat 106 to better position the occupant 104 for impact with an associated airbag or other forward structure, as described above with reference to FIGS. 3A and 3B.

In other embodiments, the extension features 420a, b and/or the extendable attachment fittings 712 can be omitted from the restraint 910b, and the desired amount of restraint extension can be provided during a dynamic event by the arrangement of the first and second webs 924a, b and the third web 932. More specifically, in the illustrated embodiments the two-point restraints 310 and 910b shown in FIGS. 8B and 9C, respectively, can be seen to include more length of web than conventional two-point restraint systems by virtue of the additional lengths of web that extend around the back of the seat occupant 104. As a result, these configurations will provide more overall extension due to stretching of the webs when subjected to a given load. Thus, if the aircraft experiences a collision or other rapid deceleration greater than a preset magnitude, the tension force in the first web 924a and the second web 924b will produce greater forward motion of the occupant than would be provided by a conventional two-point restraint, thereby enabling the restraint 910b to extend as described above with reference to FIGS. 5A-6B and more favorably position the occupant 104 for impact with an associated airbag or other forward structure, as described above with reference to FIGS. 3A and 3B.

The foregoing are provided by way of examples of suitable restraint arrangements that can be used with the present technology. In other embodiments, the various types of web extension mechanisms and features described herein can be used with other types of seat belt webs having other arrangements, and/or other types of attachment fittings, connectors, and/or buckle assemblies. For example, in other embodiments one or more of the web extension features described herein can be used with a 3-point shoulder seat belt arrangement, a 5-point seat belt arrangement, a "Y-belt" arrangement, etc.

Although various types of extension mechanisms have been described above with reference to FIGS. 4A-9C, various other types of extension mechanisms, systems, and/or features can be incorporated into the extendable restraint systems described herein to provide the desired amount of extension in response to a dynamic event. For example, with reference to FIGS. 4A and 4B, in other embodiments, rather than use the attachment fittings 112 at opposite ends of the restraint 310, the restraint 310 can utilize one or more web retractors that are configured to allow a preset portion of webbing to spool out when the restraint experiences a tension load above a preset magnitude resulting from a dynamic event. For example, such retractors can include either motorized or mechanical retraction or locking mechanisms that either mechanically react to the tension load to payout web, or respond to an electronic signal from a control unit during a dynamic event to automatically payout web. In yet other embodiments, extendable restraint systems configured for use with, for example, airbag systems as described herein can include one or more of the extension mechanisms and/or systems described in U.S. patent application Ser. No. 13/441,689, filed Apr. 6, 2012, and titled PERSONAL RESTRAINT SYSTEMS FOR USE IN RECREATIONAL UTILITY VEHICLES AND OTHER VEHICLES, which is incorporated herein in its entirety by reference. These other types of extension mechanisms and/or systems can be used in place of, or in addition to, the extension features 420, 720 described in detail herein. Accordingly, aircraft occupant safety systems configured in accordance with the present technology are not limited to use with the various extension mechanisms and features described herein, but can include various other types of suitable extension mechanisms without departing from the spirit or intent of the present disclosure.

Figure 10:
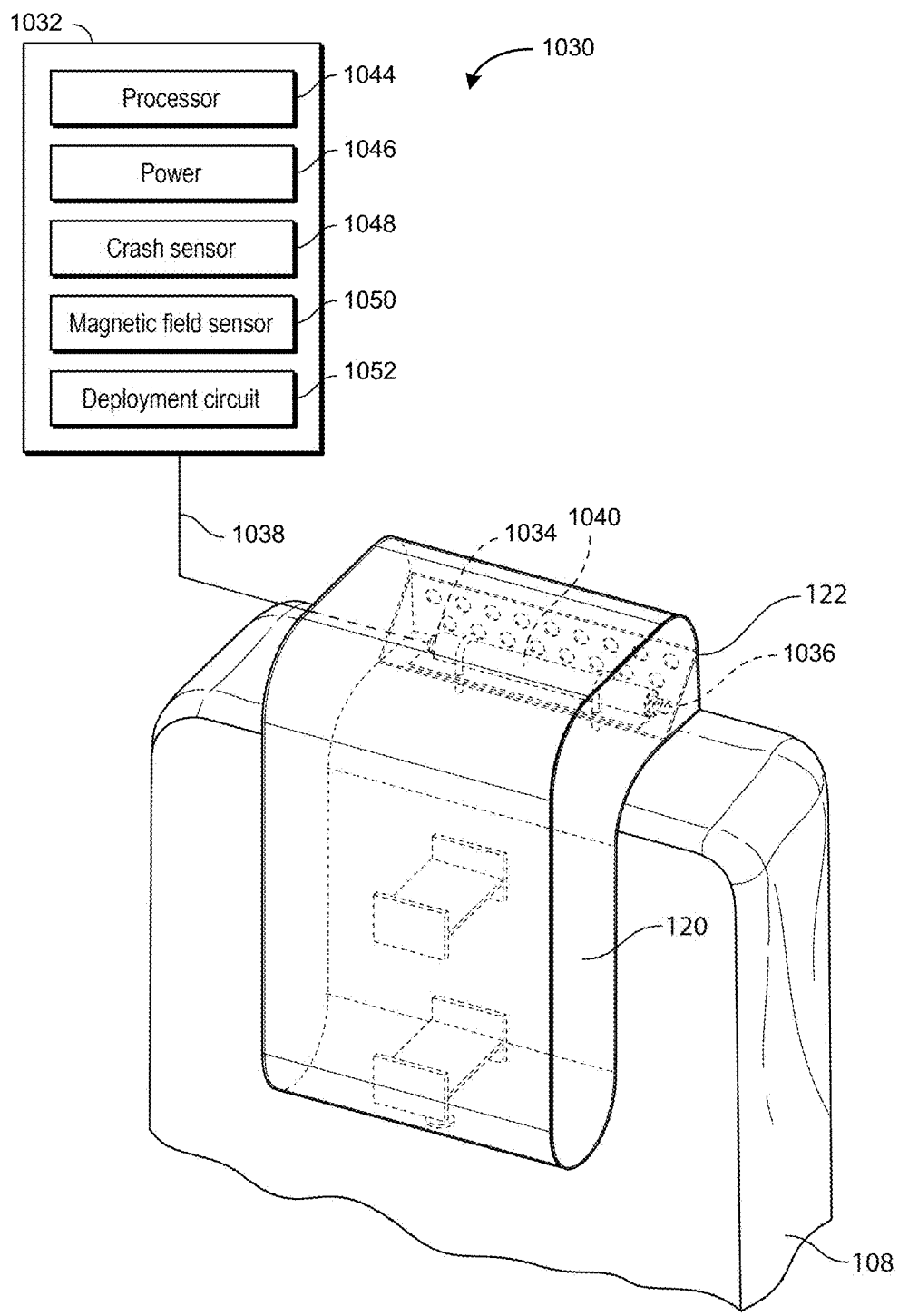
FIG. 10 is a partially schematic isometric view of an airbag system configured in accordance with an embodiment of the present technology.

FIG. 10 is a partially schematic isometric view of an upper portion of the structure 108 and an airbag inflation system 1030 configured in accordance with an embodiment of the present technology. In the illustrated embodiment, the airbag inflation system 1030 includes an electronic assembly 1032 (e.g., an electronic module assembly (EMA); shown schematically) and an airbag inflator 1040 positioned within the airbag 120. The airbag inflator 1040 can include an initiator 1034 (e.g., a pyrotechnic initiator, such as a squib) operably positioned on one end, and a diffuser 1036 positioned on the opposite end. The electronic assembly 1032 can be electrically coupled to the initiator 1034 via an electrical link 1038. In the illustrated embodiment, the electronic assembly 1032 includes a processor 1044 that receives electrical power from a power source 1046 (e.g., one or more batteries, such as lithium batteries), a deployment circuit 1052 that initiates the inflator 1040, and at least one crash sensor 1048 (e.g., an accelerometer) that detects rapid decelerations and/or other dynamic events greater than a preset or predetermined magnitude. The crash sensor 1048 can, for example, include a spring-mass damper type sensor with an inertial switch calibrated for the vehicle's operating environments that initiates airbag deployment upon a predetermined level of deceleration. In other embodiments, the crash sensor 1048 can include other types of sensors known in the art. Optionally, the electronics assembly 1032 can also include one or more magnetic field sensors 1050 that can detect the presence of an external magnetic field and communicate with the processor 1044 to deactivate the crash sensor 1048 and prevent inadvertent deployment of the airbag 120. In other embodiments, the electronic assembly 1032 can include other sensors and/or other additional features to facilitate airbag deployment, and/or some of the components of the electronic assembly 1032 may be omitted. In certain embodiments, for example, the electronic assembly 330 can include only the power source 1046 and the crash sensor 1048, which completes a circuit to activate the inflator 1040 in the event of a vehicle collision or other significant dynamic event.

In a dynamic event above a predetermined threshold (e.g., an acceleration/deceleration of a certain magnitude resulting from a vehicle crash, accident, or other significant dynamic event), the crash sensor 1048 can respond by sending a signal to the processor 1044 which causes the processor 1044 to send a corresponding signal to the deployment circuit 1052. Upon receiving the signal from the processor 1044, the deployment circuit 1052 can apply a sufficient voltage to the inflator initiator 1034 via the electrical link 1038 to activate the initiator 1034, which in turn causes the inflator 1040 to discharge its compressed gas into the airbag 120 via the diffuser 1036. The expansion of the compressed gas rapidly inflates the airbag 120 and causes it to deploy as described above. In other embodiments, the inflator 1040 can be spaced apart from the airbag 120 and be fluidly coupled thereto by a gas delivery hose (not shown) and/or other suitable fluid passageway. For example, in some embodiments the inflator 1040 can be positioned remotely from the airbag housing 122, and one end of a suitable gas delivery hose can be coupled to the inflator 1040 in place of the diffuser 1036. An opposite end of the gas delivery hose can then be positioned in fluid communication with the interior of the airbag 120, such that upon activation of the inflator 1040 the compressed gas will pass through the delivery hose and rapidly inflate the airbag 120 as described above. The airbag deployment and inflation systems described above are provided by way of example of one such suitable airbag system. It should be noted that the various embodiments of airbags described herein are not limited to the particular airbag configuration shown nor the deployment and inflation system described above, but can also be used with other types of airbags and deployment and inflation systems and, accordingly, are not limited to those described above.

Each of the following applications and patents is incorporated herein by reference in its entirety: U.S. patent application Ser. No. 09/143,756, filed Aug. 13, 1998, now U.S. Pat. No. 5,984,350, titled VEHICLE SAFETY SYSTEM; U.S. patent application Ser. No. 10/672,606, filed Sep. 26, 2003, now U.S. Pat. No. 6,957,828, titled INFLATABLE LAP BELT SAFETY BAG; U.S. patent application Ser. No. 09/253,874, filed Mar. 13, 2000, now U.S. Pat. No. 6,439,600, titled SELF-CENTERING AIRBAG AND METHOD FOR MANUFACTURING AND TUNING THE SAME; U.S. patent application Ser. No. 09/523,875, filed Mar. 13, 2000, now U.S. Pat. No. 6,535,115, titled AIR BAG HAVING EXCESSIVE EXTERNAL MAGNETIC FIELD PROTECTION CIRCUITRY; U.S. patent application Ser. No. 09/524,370, filed Mar. 14, 2000, now U.S. Pat. No. 6,217,066, titled MULTIPLE INFLATOR SAFETY CUSHION; U.S. patent application Ser. No. 12/057,295, filed Mar. 27, 2008, now U.S. Pat. No. 7,665,761, titled INFLATABLE PERSONAL RESTRAINT SYSTEMS AND ASSOCIATED METHODS OF USE AND MANUFACTURE; U.S. patent application Ser. No. 12/051,768, filed Mar. 19, 2008, now U.S. Pat. No. 7,980,590, titled INFLATABLE PERSONAL RESTRAINT SYSTEMS HAVING WEB-MOUNTED INFLATORS AND ASSOCIATED METHODS OF USE AND MANUFACTURE; U.S. patent application Ser. No. 13/608,959, filed Sep. 10, 2012, titled ELECTRONIC MODULE ASSEMBLY FOR INFLATABLE PERSONAL RESTRAINT SYSTEMS AND ASSOCIATED METHODS; U.S. patent application Ser. No. 13/170,079, filed Jun. 27, 2011, now abandoned, titled SENSORS FOR DETECTING RAPID DECELERATION/ACCELERATION EVENTS; U.S. patent application Ser. No. 13/194,411, filed Jul. 29, 2011, now U.S. Pat. No. 8,439,398, titled INFLATOR CONNECTORS FOR INFLATABLE PERSONAL RESTRAINTS AND ASSOCIATED SYSTEMS AND METHODS; U.S. patent application Ser. No. 13/227,392, filed Sep. 7, 2011, now U.S. Pat. No. 8,556,293, titled BUCKLE CONNECTORS FOR INFLATABLE PERSONAL RESTRAINTS AND ASSOCIATED METHODS OF USE AND MANUFACTURE; U.S. patent application Ser. No. 13/086,134, filed Apr. 13, 2011, now U.S. Pat. No. 8,469,397, titled STITCH PATTERNS FOR RESTRAINT-MOUNTED AIRBAGS AND ASSOCIATED SYSTEMS AND METHODS; U.S. patent application Ser. No. 13/227,382, filed Sep. 7, 2011, now U.S. Pat. No. 8,403,361, titled ACTIVATION SYSTEMS FOR INFLATABLE PERSONAL RESTRAINT SYSTEMS; U.S. patent application Ser. No. 13/174,659, filed Jun. 30, 2011, titled INFLATABLE PERSONAL RESTRAINT SYSTEMS; U.S. patent application Ser. No. 13/228,333, filed Sep. 8, 2011, now U.S. Pat. No. 8,818,759, titled COMPUTER SYSTEM FOR REMOTE TESTING OF INFLATABLE PERSONAL RESTRAINT SYSTEMS; U.S. patent application Ser. No. 11/468,170, filed Aug. 25, 2014, titled COMPUTER SYSTEM FOR REMOTE TESTING OF INFLATABLE PERSONAL RESTRAINT SYSTEMS; U.S. patent application Ser. No. 13/424,197, filed Mar. 19, 2012, now U.S. Pat. No. 8,523,220, titled STRUCTURE MOUNTED AIRBAG ASSEMBLIES AND ASSOCIATED SYSTEMS AND METHODS; U.S. patent application Ser. No. 14/384,655, filed Sep. 11, 2014, titled STRUCTURE MOUNTED AIRBAG ASSEMBLIES AND ASSOCIATED SYSTEMS AND METHODS; U.S. Provisional Patent Application No. 62/041,549, filed Aug. 25, 2014, titled AIRBAG ASSEMBLY FOR LEG FLAIL PROTECTION AND ASSOCIATED SYSTEMS AND METHODS; and U.S. patent application Ser. No. 14/505,277, filed Oct. 2, 2014, titled ACTIVE POSITIONING AIRBAG ASSEMBLY AND ASSOCIATED SYSTEMS AND METHODS.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A seating area in an aircraft, the seating area comprising:
   a seat for an occupant;
   an object positioned generally forward of the seat; and
   a restraint configured to be fastened around the occupant's body to secure the occupant in the seat, wherein the restraint includes—
      at least one extension feature configured to allow the occupant's body to move toward the object before impacting the object in response to a dynamic event;
      a first web configured to be fixedly attached to at least one anchor point proximate the seat, wherein the at least one extension feature is operably coupled to the first web;
      a second web attached to the first web, the second web having a first end portion and a second end portion;
      a web connector attached to the first end portion of the second web; and
      a buckle assembly attached to the second end portion of the second web, wherein the buckle assembly is configured to releasably engage the web connector to fasten the second web around the occupant's waist.

2. The seating area of claim 1 wherein the extension feature enables the restraint to increase in length in response to a dynamic load from the occupant's body.

3. The seating area of claim 1 wherein the extension feature enables the restraint to increase in length a distance of from about 4 inches to about 10 inches in response to a dynamic load from the occupant's body.

4. The seating area of claim 1 wherein the restraint is a 2-point restraint configured to extend around the occupant's waist, and wherein the extension feature is configured to allow the occupant's waist to move toward the airbag in response to the dynamic event.

5. The seating area of claim 1 wherein the extension feature is configured to allow the occupant's body to move toward the airbag a distance of from about 2 inches to about 5 inches in response to the dynamic event.

6. The seating area of claim 1, further comprising:
   a structure fixedly attached to a floor of the seating area, wherein the object is an airbag configured to inflate and deploy between the structure and the occupant in response to the dynamic event.

7. The seating area of claim 6 wherein the airbag is stowed in a housing carried by the structure, and wherein the airbag deploys from the housing and inflates between the structure and the occupant in response to the dynamic event.

8. The seating area of claim 6 wherein the seat has a centerline oriented at an angle relative to a longitudinal axis of the aircraft, and wherein the airbag is offset from the centerline of the seat.

9. A restraint system for use with an aircraft seat, the restraint system comprising:
   a first web configured to be attached to at least one of the aircraft seat or a portion of the aircraft adjacent the aircraft seat;
   a second web attached to the first web, the second web having a first end portion and a second end portion;
   a web connector attached to the first end portion of the second web; and
   a buckle assembly attached to the second end portion of the second web, wherein the buckle assembly is configured to releasably engage the web connector to fasten the second web around the waist of an occupant sitting in the aircraft seat.

10. The restraint system of claim 9 wherein the first web includes a first end portion and a second end portion, wherein the first end portion of the first web is configured to be fixedly attached to a first anchor point on one side of the aircraft seat, and wherein the second end portion of the first web is configured to be attached to a second anchor point on an opposite side of the aircraft seat.

11. The restraint system of claim 9, further comprising means for extending the first web in response to a tension load in the first web.

12. The restraint system of claim 11 wherein the means for extending the first web are incorporated into the first web.

13. The restraint system of claim 11 wherein the means for extending the first web include a portion of the first web that is folded over on itself and fastened together by stitching, and wherein the stitching is configured to break under the tension load in the first web and release the portion of the first web that is folded over on itself.

14. The restraint system of claim 11 wherein the first web includes an end portion, wherein the restraint system further comprises an attachment fitting fixedly attaching the end portion of the first web to an anchor point at least proximate the aircraft seat, and wherein the means for extending the first web is incorporated into the attachment fitting.

15. The restraint system of claim 11 wherein the first web includes an end portion, and wherein the restraint system further comprises:
   an attachment fitting fixedly attached to the end portion of the first web, wherein the means for extending the first web include—
      an elongate slot in the attachment fitting, the elongate slot having a first end portion spaced apart from a second end portion, and the elongate slot further having a first sidewall spaced apart from a second sidewall by a first width; and
      a bolt extending through the first end portion of the elongate slot and fixedly attaching the attachment fitting to an anchor point at least proximate the aircraft seat, wherein the bolt has a second width that is greater than the first width, and wherein the tension load in the first web causes the attachment fitting to move relative to the bolt until the bolt comes to bear against the second end portion of the elongate slot.

16. The restraint system of claim 11, further comprising an airbag configured to be carried on a structure positioned generally forward of the aircraft seat, wherein the airbag is further configured to inflate and deploy between the structure and the occupant in response to a dynamic event that accelerates the occupant toward the structure, and wherein the acceleration of the occupant toward the structure causes the tension load in the first web.

17. A restraint system for use with an aircraft seat, the restraint system comprising:
   a first web having a proximal end portion and a distal end portion, wherein the proximal end portion of the first web is configured to be attached to at least one of the aircraft seat or a portion of the aircraft adjacent the aircraft seat on a first side of the aircraft seat;
   a second web having a proximal end portion and a distal end portion, wherein the proximal end portion of the second web is configured to be attached to at least one of the aircraft seat or a portion of the aircraft adjacent the aircraft seat on a second side of the aircraft seat;
   a third web having a first end portion slidably attached to the first web and a second end portion slidably attached to the second web;
   a web connector attached to the distal end portion of the first web; and
   a buckle assembly attached to the distal end portion of the second web, wherein the buckle assembly is configured to releasably engage the web connector to fasten the first and second webs around the waist of an occupant sitting in the aircraft seat, and wherein the third web is configured to extend behind the occupant when the first and second webs are fastened around the waist of the occupant.

18. The restraint system of claim 17, further comprising means for extending at least the first web in response to a tension load in the first web.

19. The restraint system of claim 18 wherein the means for extending are incorporated into the first web.

20. The restraint system of claim 18 wherein the means for extending include a portion of the first web that is folded over on itself and fastened together by stitching, and wherein the stitching is configured to break under the tension load in the first web and release the portion of the first web that is folded over on itself.

21. The restraint system of claim 18 wherein the restraint system further comprises an attachment fitting fixedly attaching the proximal end portion of the first web to an anchor point at least proximate the aircraft seat, and wherein the means for extending are incorporated into the attachment fitting.

22. The restraint system of claim 18 wherein the restraint system further comprises:
   an attachment fitting fixedly attached to the proximal end portion of the first web, wherein the means for extending include—
      an elongate slot in the attachment fitting, the elongate slot having a first end portion spaced apart from a second end portion, and the elongate slot further having a first sidewall spaced apart from a second sidewall by a first width; and
      a bolt extending through the first end portion of the elongate slot and fixedly attaching the attachment fitting to an anchor point at least proximate the aircraft seat, wherein the bolt has a second width that is greater than the first width, and wherein the tension load in the first web causes the attachment fitting to move relative to the bolt until the bolt comes to bear against the second end portion of the elongate slot.

23. A method of protecting an occupant sitting in an aircraft seat positioned behind a structure during a dynamic event, the method comprising:
   providing the aircraft seat with a 2-point restraint, the 2-point restraint having—
      a first web configured to be attached to at least one of the aircraft seat or a portion of the aircraft adjacent the aircraft seat;
      a second web attached to the first web, the second web having a first end portion and a second end portion;
      a web connector attached to the first end portion of the second web; and
      a buckle assembly attached to the second end portion of the second web, wherein the buckle assembly is configured to releasably engage the web connector to fasten the second web around the occupant's waist;
   providing an airbag;
   controlling movement of the occupant toward the structure in response to the dynamic event, wherein controlling movement of the occupant includes—
      restricting the 2-point restraint to a first length if the dynamic event is less than a threshold magnitude; and enabling the 2-point restraint to extend to a second length, greater than the first length, if the dynamic event is greater than the threshold magnitude; and inflating the airbag between the structure and the occupant if the dynamic event is greater than the threshold magnitude, wherein controlling movement of the occupant includes controlling the orientation of the occupant at impact with the airbag.

24. The method of claim 23, wherein enabling the 2-point restraint to extend to a second length, greater than the first length, if the dynamic event is greater than the threshold magnitude controls an angle of the occupant's torso relative to the structure as the occupant moves toward the structure during the dynamic event.

* * * * *